US012599880B2

(12) United States Patent
Oh et al.

(10) Patent No.: US 12,599,880 B2
(45) Date of Patent: Apr. 14, 2026

(54) RAW MATERIAL/CONTAINER SUPPLY DEVICE FOR INDIVIDUAL-SPECIFIC COSMETICS MANUFACTURING SELLING MACHINE

(71) Applicants: DAESUNG HI-TECH CO., LTD., Daegu (KR); LILLYCOVER CO., LTD., Daegu (KR)

(72) Inventors: Dae Myung Oh, Goryeong (KR); Tae Kyung Noh, Daegu (KR); Woo Kak Choi, Daegu (KR); Sun Hee An, Daegu (KR)

(73) Assignees: DAESUNG HI-TECH CO., LTD., Daegu (KR); LILLYCOVER CO., LTD., Daegu (KR)

( * ) Notice: Subject to any disclaimer, the term of this patent is extended or adjusted under 35 U.S.C. 154(b) by 107 days.

(21) Appl. No.: 18/712,219

(22) PCT Filed: Dec. 1, 2021

(86) PCT No.: PCT/KR2021/017931

§ 371 (c)(1),
(2) Date: Nov. 27, 2024

(87) PCT Pub. No.: WO2023/095984

PCT Pub. Date: Jun. 1, 2023

(65) Prior Publication Data

US 2025/0099930 A1 Mar. 27, 2025

(30) Foreign Application Priority Data

Nov. 23, 2021 (KR) ........................ 10-2021-0161809

(51) Int. Cl.
*B01F 33/84* (2022.01)
*A45D 44/00* (2006.01)
(Continued)

(52) U.S. Cl.
CPC .......... *B01F 33/844* (2022.01); *A45D 44/005* (2013.01); *B01F 35/2117* (2022.01);
(Continued)

(58) Field of Classification Search
None
See application file for complete search history.

(56) References Cited

U.S. PATENT DOCUMENTS

| | | | | |
|---|---|---|---|---|
| 6,510,366 B1 * | 1/2003 | Murray | ................ | A45D 44/005 700/285 |
| 2015/0129611 A1 * | 5/2015 | Vulpitta | .................. | A23G 9/22 222/214 |

FOREIGN PATENT DOCUMENTS

| | | |
|---|---|---|
| JP | 2008-532100 A | 8/2008 |
| KR | 10-2019-0128349 A | 11/2019 |

(Continued)

*Primary Examiner* — Tanzim Imam
(74) *Attorney, Agent, or Firm* — IP & T GROUP LLP

(57) ABSTRACT

A raw material/container supply device for an individual-specific cosmetic manufacturing selling machine is capable of making it possible to check the remaining amounts of respective raw materials in real time even from a remote location and is capable of preventing the mixing of impurities during replenishment of raw materials. The raw material/container supply device includes a raw material supply device configured to supply cosmetic raw materials contained in disposable raw material pouches and a container supply device configured to supply a container having a container body and a cap fastened to the container body in a state in which the container is horizontally loaded on a cartridge.

13 Claims, 21 Drawing Sheets

(51) Int. Cl.

| | |
|---|---|
| ***B01F 35/21*** | (2022.01) |
| ***B01F 35/22*** | (2022.01) |
| ***B01F 35/71*** | (2022.01) |
| ***B01F 101/21*** | (2022.01) |
| ***B65B 3/04*** | (2006.01) |
| ***B65B 7/28*** | (2006.01) |
| ***B65B 57/10*** | (2006.01) |

(52) U.S. Cl.
CPC ...... *B01F 35/2205* (2022.01); *B01F 35/7176* (2022.01); *B65B 3/04* (2013.01); *B65B 7/2828* (2013.01); *B65B 57/10* (2013.01); *B01F 2101/21* (2022.01)

(56) References Cited

FOREIGN PATENT DOCUMENTS

| | | | | | |
|---|---|---|---|---|---|
| KR | 10-2086661 | B1 | | 3/2020 | |
| KR | 10-2187090 | B1 | | 12/2020 | |
| KR | 10-2211803 | B1 | | 2/2021 | |
| KR | 20210019869 | A | * | 2/2021 | .............. B01F 31/44 |
| KR | 10-2351906 | B1 | | 1/2022 | |
| KR | 10-2392405 | B1 | | 5/2022 | |

* cited by examiner

RAW MATERIAL/CONTAINER SUPPLY DEVICE FOR INDIVIDUAL-SPECIFIC COSMETICS MANUFACTURING SELLING MACHINE

CROSS-REFERENCE TO RELATED PATENT APPLICATIONS

This application is a United States national phase application of International App. No. PCT/KR2021/017931, dated Dec. 1, 2021, which claims the benefit of Korean Pat. App. No. 10-2021-0161809, dated Nov. 23, 2021, the disclosures of which are hereby incorporated herein by reference in their entirety.

TECHNICAL FIELD

The present invention relates to a raw material/container supply device for an individual-specific cosmetics manufacturing selling machine installed in the form of a vending machine at airports, terminals, department stores, shopping malls, and the like. More particularly, the present invention pertains to a raw material/container supply device for an individual-specific cosmetics manufacturing selling machine capable of preventing the mixing of impurities into a container and complying with cosmetics manufacturing standards by supplying respective raw materials of cosmetics in pouches and supplying a container of cosmetics with a container body and a cap fastened to each other.

BACKGROUND ART

In general, cosmetics are mass-produced by cosmetic manufacturers and sold to consumers through beauty-related stores.

Further, cosmetics can be manufactured only by those who have certain manufacturing and quality control facilities and who have obtained permission from the authorities.

However, it can be said that it is practically impossible for a cosmetics manufacturer to manufacture cosmetics in consideration of the preferences and skin characteristics of numerous consumers.

As a result, cosmetics manufacturers tend to manufacture cosmetics so that problems such as skin troubles and the like do not occur, which limits the ability to satisfy various needs of consumers.

Thus, consumers have the inconvenience of finding and purchasing cosmetics suitable for their skin.

Recently, in order to manage acne, wrinkles, blemishes, stains, and the like, functional cosmetics obtained by adding specific ingredients to cosmetics are manufactured and sold.

However, it is difficult for the aforementioned functional cosmetics to satisfy all the needs of consumers with different skin characteristics.

In order to solve this problem, an individual-specific cosmetics manufacturing apparatus that allows consumers to directly manufacture cosmetics suitable for their skin characteristics has been proposed.

As an example, an "individual-specific cosmetics manufacturing apparatus" is disclosed in Korean Patent No. 10-2211803.

The above-described conventional cosmetics manufacturing apparatus includes a robot arm, a container supply part for supplying a cosmetic container, a nozzle part for injecting cosmetic raw materials into the cosmetic container, a transfer part for transferring the cosmetic container to the nozzle part, a cap supply part for supplying a cap of the cosmetic container, a stirring part for stirring the cosmetic raw materials in the cosmetic container, and a work table having an upper plate and a space below the upper plate.

The container supply part, the nozzle part, the transfer part, the cap supply part, and the stirring part are arranged around the robot arm.

The cosmetic container is sequentially moved to the container supply part, the transfer part, and the stirring part by the robot arm.

According to the above-described conventional cosmetics manufacturing apparatus, there is an advantage that cosmetics suitable for a skin condition of a consumer can be manufactured.

However, the conventional cosmetics manufacturing apparatus has the following problems.

First, the respective cosmetic raw materials are stored in raw material storage containers and supplied from the raw material storage containers. Therefore, when the raw materials are exhausted, the raw materials have to be filled in the raw material storage containers one by one. In this process, impurities may be mixed or air oxidation may occur.

In addition, since the raw material storage containers are provided in the lower part of the housing, it is inconvenient to visually check the amounts of the remaining raw materials, and it is necessary to periodically check the remaining amounts of the raw materials.

In addition, even when the operation of a raw material injection pump is stopped, the solution remaining in a raw material supply pipe flows toward an injection nozzle for a certain period of time.

Accordingly, when the cosmetic storage container is moved to the next injection nozzle after one type of cosmetic raw material is injected, the raw material solution remaining in the previous raw material supply pipe and injection nozzle is leaked to contaminate the surroundings.

In order to prevent this problem, it is necessary to move the container to the next nozzle after the operation of the raw material injection pump is stopped and the raw material remaining in the injection nozzle falls in its entirety. In this case, the cosmetics manufacturing time is prolonged.

In addition, since the cosmetic container and the cap are separately supplied into the housing, impurities may be mixed into the container.

As a result, it is difficult to comply with the cosmetic manufacturing standards stipulated in the relevant laws and regulations, and there is a difficulty in quality control.

SUMMARY

In view of the problems inherent in the related art, it is an object of the present invention to provide a technique capable of eliminating the need to check the remaining amounts of respective raw materials one by one and making it possible to check the remaining amounts of respective raw materials in real time even from a remote location.

Another object of the present invention is to provide a technique capable of, when a container is moved to the next nozzle after one type of cosmetic raw material is injected into the container, preventing the raw material remaining in the previous raw material supply pipe and nozzle from being leaked to contaminate the surroundings.

A further object of the present invention is to provide a technique capable of preventing the mixing of impurities and the occurrence of air oxidation when replenishing raw materials.

A further object of the present invention is to provide a technique capable of complying with the strict cosmetic manufacturing standards stipulated in the relevant laws and regulations.

In order to achieve these objects, there is provided a raw material/container supply device for an individual-specific cosmetic manufacturing selling machine for supplying liquid cosmetic raw materials and a raw material storage container, including: a raw material supply device configured to supply cosmetic raw materials contained in disposable raw material pouches; and a container supply device configured to supply a container having a container body and a cap fastened to the container body, in a state in which the container is horizontally loaded on a cartridge.

Further, each of the raw material pouches has a through-hole formed in an upper portion thereof so that each of the raw material pouches is hung on a hook through the through-hole, and a remaining amount check load cell for detecting a remaining amount of raw material in each of the raw material pouches is provided on an upper portion of the hook.

Further, the remaining amount check load cell is configured to detect a decrease in the weight of each of the raw material pouches and transmit the decrease in the weight to a control part provided in a lower portion of a housing.

Further, the control part is configured to transmit a shortage of the raw material detected by the remaining amount check load cell to a remote central control device, and the central control device is configured to wirelessly transmit the shortage of the raw material through a wireless terminal of a manager of the cosmetic manufacturing selling machine.

Further, the raw material supply device includes a plurality of pumps configured to feed the raw material in each of the raw material pouches to a raw material injection part through a raw material supply pipe, a plurality of driving motors configured to drive the plurality of pumps, and a retention prevention device configured to prevent the raw material from remaining in the raw material supply pipe and an injection nozzle after the raw material is injected into the container.

Further, the retention prevention device includes a body portion, a pouch connecting member configured to connect the body portion and each of the raw material pouches, and an injection nozzle connecting member configured to connect the body portion and the injection nozzle.

Further, the body portion has a first flow path connected to the pouch connecting member, a second flow path vertically branched from the first flow path, a third flow path vertically branched from the second flow path, and a fourth flow path configured to connect the first flow path and the third flow path to each other.

Further, a first ball, a first spring and a first sealing member are provided in the second flow path, and a second ball, a second spring and a second sealing member are provided in the fourth flow path.

Further, the container supply device includes a cartridge loading part configured to accommodate a plurality of cartridges loaded with a plurality of containers, and a cartridge transfer device provided on one side of the cartridge loading part and configured to transfer the cartridges loaded with the plurality of containers in a horizontal direction.

Further, a cartridge discharging device for detecting and pushing an empty cartridge to the outside of the cartridge loading part is further provided on the other side of the cartridge loading part.

Further, the raw material/container supply device of claim further includes: a container erection member configured to rotate the container discharged from the bottom of the cartridge by 90 degrees after the container is moved by a predetermined distance.

Further, the raw material/container supply device further includes: a cap separation/fastening device configured to separate a cap from the container moved by a gripper of an articulated robot and fasten the cap after the raw materials are injected into a container body.

Further, the cap separation/fastening device e includes a cap separation/fastening part configured to separate and fasten the cap from and to the container body by rotating the container body in a state in which the cap is gripped by the gripper of the articulated robot, and a cap storage part configured to temporarily store the cap separated from the container body.

Further, the cap separation/fastening part includes a rotary spindle configured to rotate the container body forward and reverse, a speed reducer provided under the rotary spindle, and a driving motor provided under the speed reducer.

According to the present invention, it is possible to automatically manufacture and sell high-quality cosmetics suitable for the skin of various consumers in a safe and clean state.

In addition, by supplying each cosmetic raw material in the form of a pouch, it is possible to reliably prevent impurities from being mixed into the container, and to prevent air oxidation that may otherwise occur during the replenishment of raw materials.

In addition, by providing the retention prevention device in the raw material injection part, it is possible to prevent the raw material solution from remaining in the raw material supply pipe and the injection nozzle after the raw material is injected into the container.

Thus, it is possible to, when the container is moved to the next nozzle after one type of cosmetic raw material is injected into the container, prevent the raw material remaining in the previous raw material supply pipe and injection nozzle from being leaked to contaminate the surroundings.

In addition, it is possible to automatically grasp the remaining amount of each raw material by the load cell provided on the upper part of each raw material pouch, and to grasp the remaining amount of each raw material in real time even at a remote location.

In addition, by supplying the container with the cap placed on the container body, it is possible to prevent impurities from entering the container.

In addition, by supplying the container while loading the container onto the cartridge in a lying state, it is possible to supply many containers at a time.

In addition, it is possible to comply with the cosmetics manufacturing standards stipulated in the relevant laws and regulations.

In addition, it is possible to efficiently manage a plurality of cosmetics manufacturing apparatuses by the remote central control device.

In addition, by wirelessly connecting the central control device and the manager's mobile terminal, it is possible to allow the manager of each manufacturing apparatus to grasp in real time and quickly respond to the shortage of raw materials, the occurrence of abnormalities in the apparatus, and the like.

DETAILED DESCRIPTION

Preferred embodiments of the present invention will now be described in detail with reference to the accompanying drawings.

Figure 1:
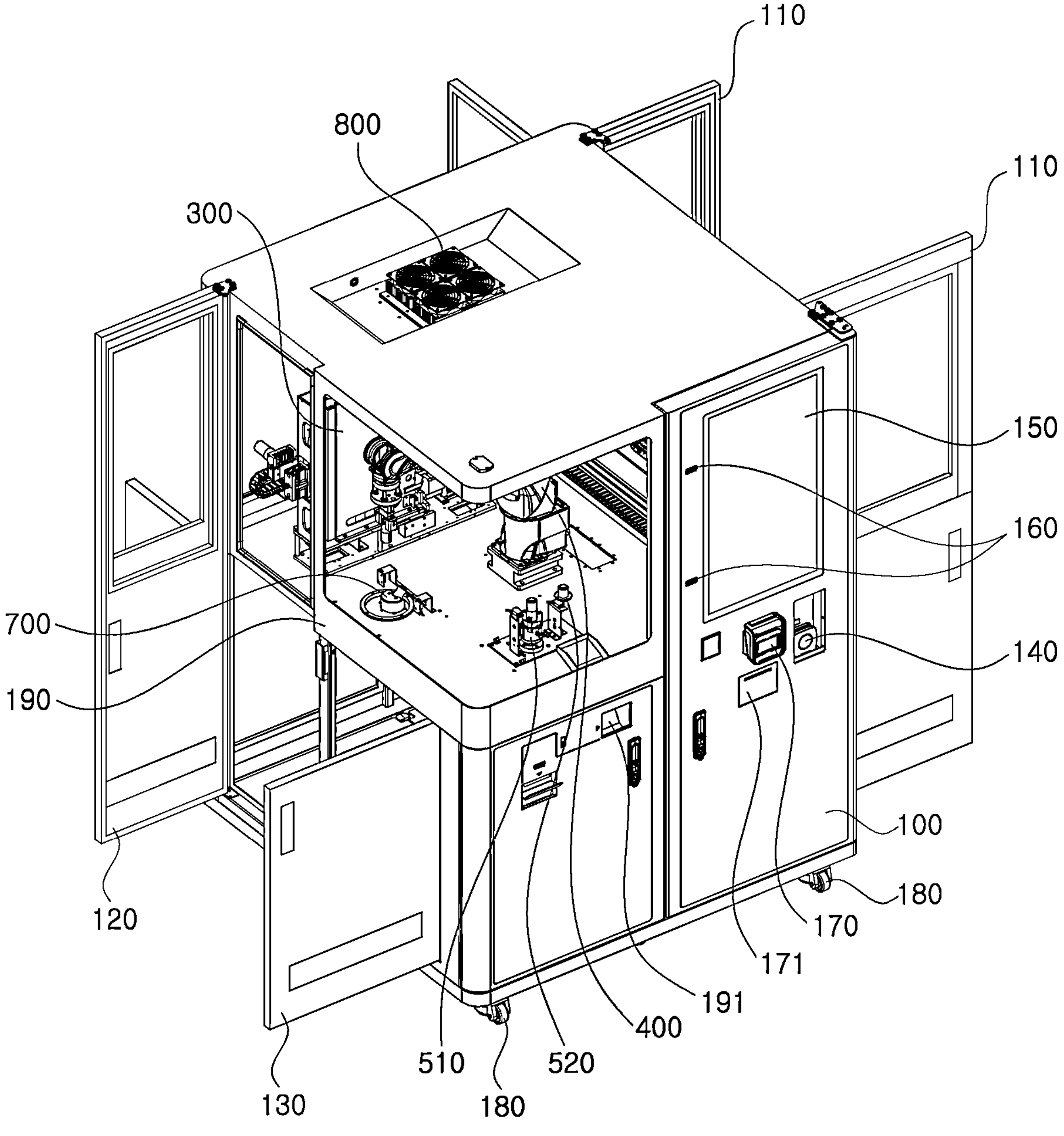
FIG. 1 is an overall perspective view of a cosmetics manufacturing apparatus according to the present invention.
Figure 2:
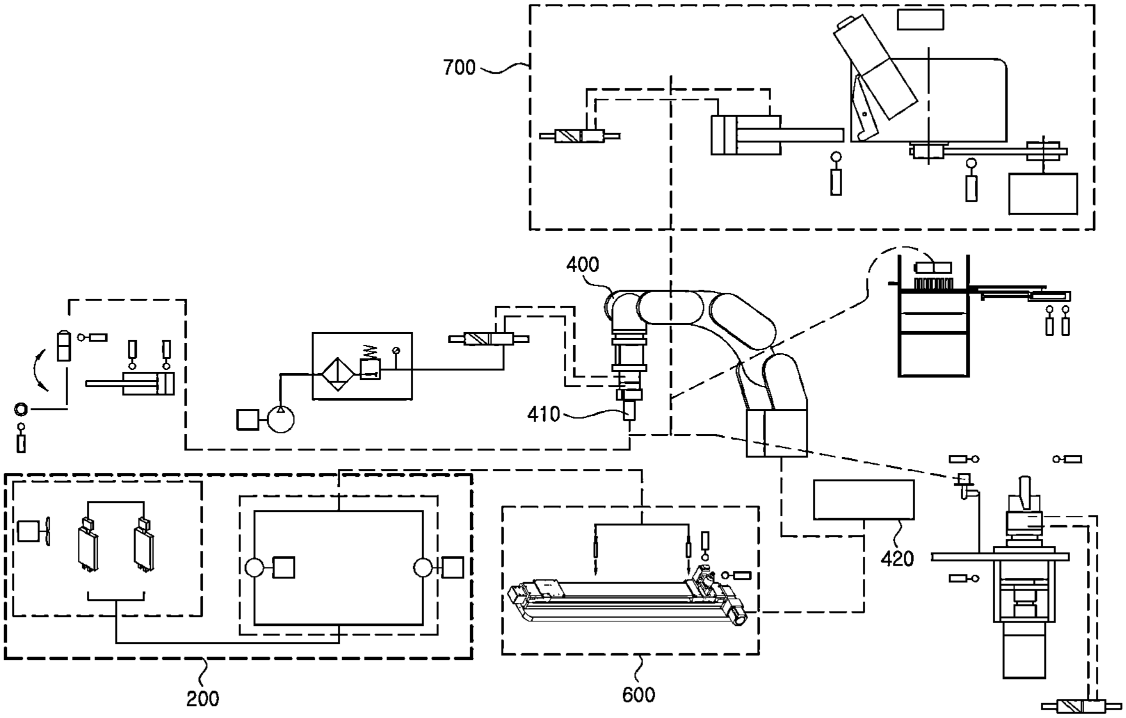
FIG. 2 is a configuration diagram for explaining each configuration of the cosmetics manufacturing apparatus according to the present invention.

As shown in FIGS. 1 and 2, the individual-specific cosmetics manufacturing selling machine according to the present invention (hereinafter simply referred to as 'the present manufacturing apparatus') includes a housing 100, a raw material supply part 200 provided inside the housing 100 and configured to supply liquid cosmetic raw materials (hereinafter simply referred to as 'raw materials'), a container supply part 300 configured to supply a cosmetic container, a raw material injection part 600 configured to inject the cosmetic raw materials into the cosmetic container, an articulated robot 400 configured to pick up the cosmetic container from the container supply part 300 and place the cosmetic container at a predetermined position, a stirrer 700 configured to stir the cosmetic raw materials injected into the cosmetic container, and a cosmetics outlet 191 configured to discharge a manufactured cosmetics to the outside of the housing 100.

The housing 100 includes a table 190, a raw material supply part door 110, a container supply part door 120, and a lower door 130.

In the table 100, the raw material supply part 200, the container supply part 300, the raw material injection part 600, and the stirrer 700 are provided around the articulated robot 400.

In addition, casters 180 are provided at the lower portion of the housing 100, so that the present manufacturing apparatus can be easily moved to a desired location.

The upper surface of a raw material supply part door 110 and the upper portion of a container supply part door 120 are composed of a transparent window.

Accordingly, the manager can visually grasp the situation inside the apparatus, and the consumer can visually check the cosmetics manufacturing process.

On the front side of the present manufacturing apparatus, there are provided a touch screen 150 configured to allow the consumer to select the type of cosmetics, the raw material ingredients, the payment method, and the like, a camera 160 configured to recognize the face of the consumer, a card reader 170, a receipt output part 171, and a cosmetics outlet 191 configured to discharge the manufactured cosmetics to the outside of the housing 100.

Figure 3:
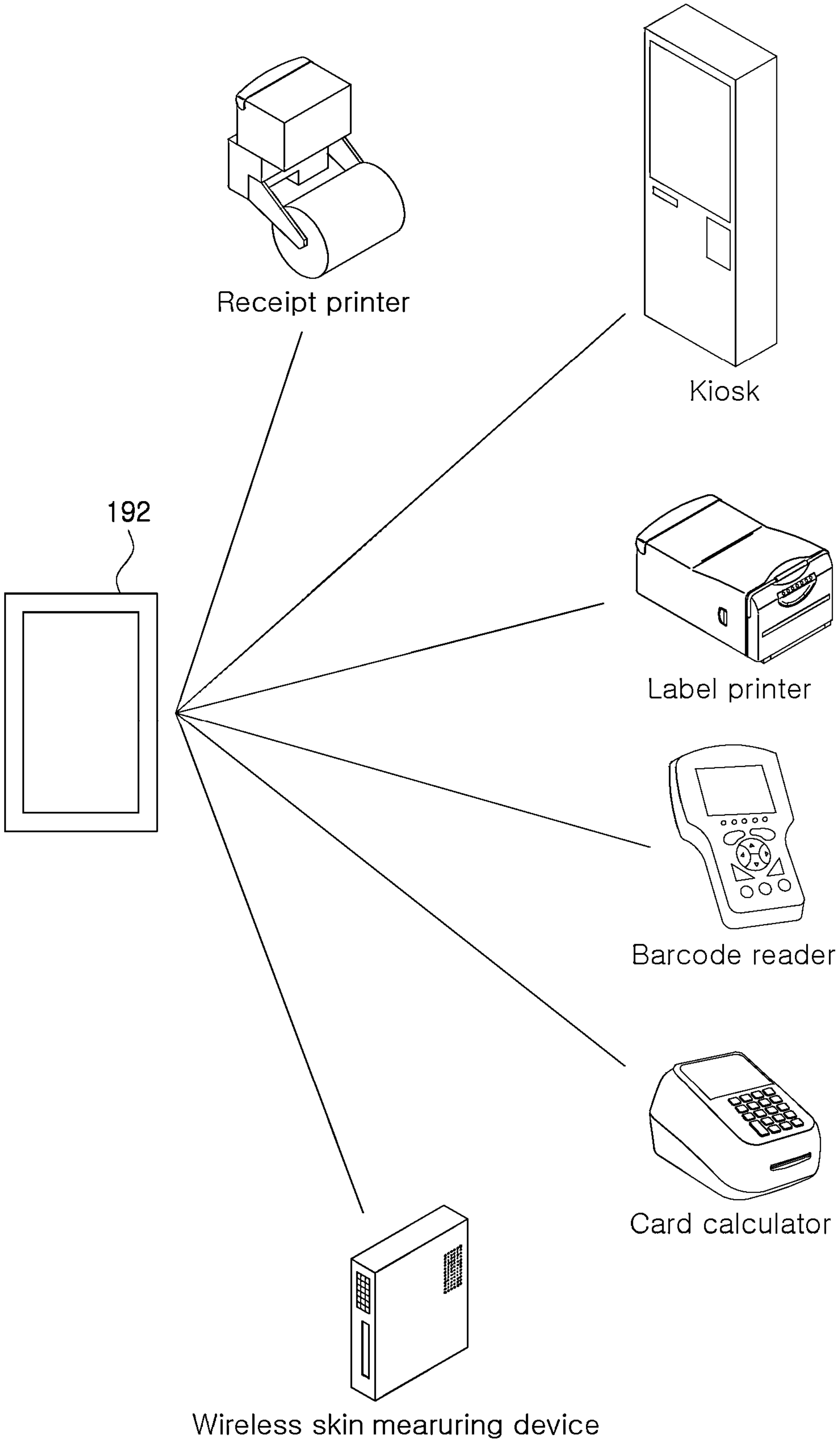
FIG. 3 is a view showing the configuration of a control part according to the present invention.

In addition, in the space under the table 190, as shown in FIG. 3, a control part 192 for controlling a receipt printer, a label printer, a barcode reader, a card calculator and each component of the present manufacturing apparatus, a communication apparatus configured to for communicate with a remote central control device, and the like are provided.

Figure 4:
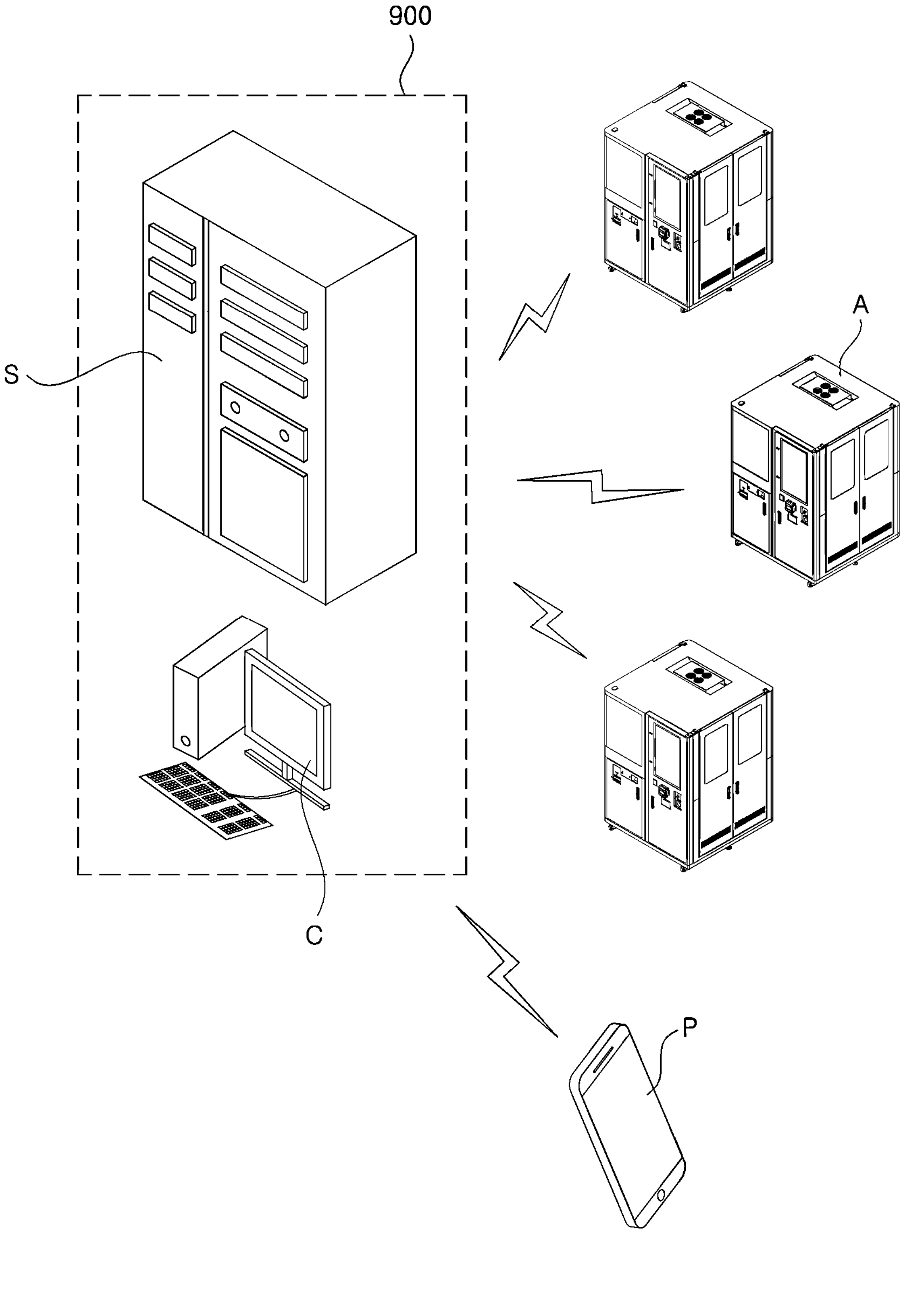
FIG. 4 is a view showing a method of connecting the cosmetic manufacturing apparatus and the central control device according to the present invention.

In the present invention, as shown in FIG. 4, a plurality of present manufacturing apparatuses is connected to a remote central control device 900 through a communication network.

The communication network may be implemented as a wired/wireless communication network such as a local area network (LAN), a wide area network (WAN), a value added network (VAN), a mobile communication network (mobile radio communication network), a Wibro (Wireless Broadband Internet), a mobile WiMAX, a satellite communication network, or the like.

In addition, the remote central control device 900 is configured to include a server S and a computer C that store data on ingredients and composition ratios of cosmetic raw materials related to skin conditions.

The server S accumulates the corresponding data each time when the consumer uses the present manufacturing apparatus.

In addition, the central control device 900 is connected to the portable terminal P of the manager who manages the present manufacturing apparatus.

The portable terminal P may be formed of a smart phone, a Personal Communication System (PCS), a Global System for Mobile communication (GSM), a Personal Digital Cellular (PDC), a Personal Handphone System (PHS), a Personal Digital Assistant (PDA), a W-Code Division Multiple Access (W-CDMA), a Wireless Broadband Internet (Wibro) terminal, or the like.

Thus, the remote central control device 900 can integrally manage each manufacturing apparatus at a remote location.

In addition, when the shortage of raw materials or the failure of the manufacturing apparatus occurs, an alarm signal may be immediately transmitted to each apparatus manager so that the manager can respond promptly.

For example, the central control device 900 may detect in real time which raw material is insufficient in each manufacturing apparatus, and may transmit this information to the manager of the corresponding manufacturing apparatus through the portable terminal P.

Hereinafter, the raw material supply part of the present manufacturing apparatus will be described with reference to FIGS. 5 to 8.

The raw material supply part 200 according to the present invention is used for supplying various cosmetic raw materials, and includes a plurality of raw material pouches 220 containing liquid cosmetic raw materials, a plurality of hooks 280 configured to hold upper portions of the respective raw material pouches 220, a plurality of remaining amount check load cells 210 provided on the upper portions of the hooks 280 to detect the remaining amounts of the raw materials in the respective raw material pouches 220, a plurality of pumps configured to transfer the raw materials in the raw material pouches 220 to the raw material injection part 600 through raw material supply pipes, and a plurality of driving motors configured to drive the pumps.

The raw material pouches 220 are plastic bags containing raw materials, and are provided as many as the number of raw materials to be used. In addition, the remaining amount check load cells 210 and the hooks 280 are also provided as much as the number of raw materials to be used.

For example, when 40 kinds of raw materials are used, 40 raw material pouches 220 are supplied in the form of hanging on the hooks 280 provided below 40 remaining amount check load cells 210. This is an application of a method of injecting Ringer's solution into a patient at a hospital.

Each of the remaining amount check load cells 210 detects a decrease in the weight of the raw material pouch 220 due to the use of the raw material, and grasps the remaining amount of the raw material remaining inside the raw material pouch 220.

The control part 192 provided below the housing 100 notifies the ingredient of the raw material pouch 220 having an insufficient remaining amount to the remote central control device 900 in real time.

Then, the central control device 900 notifies the manufacturing apparatus and the insufficient raw material to the manager terminal P of the corresponding manufacturing apparatus.

Accordingly, the manager of the manufacturing apparatus can quickly replace the insufficient raw material pouch 220.

Since the upper portion of the raw material supply part door 110 is formed of a transparent window, the manager of the manufacturing apparatus may visually determine whether the raw material pouch 220 is to be replaced.

In the present invention, the raw material injection part 600 further includes a retention prevention device 230.

Figure 8:
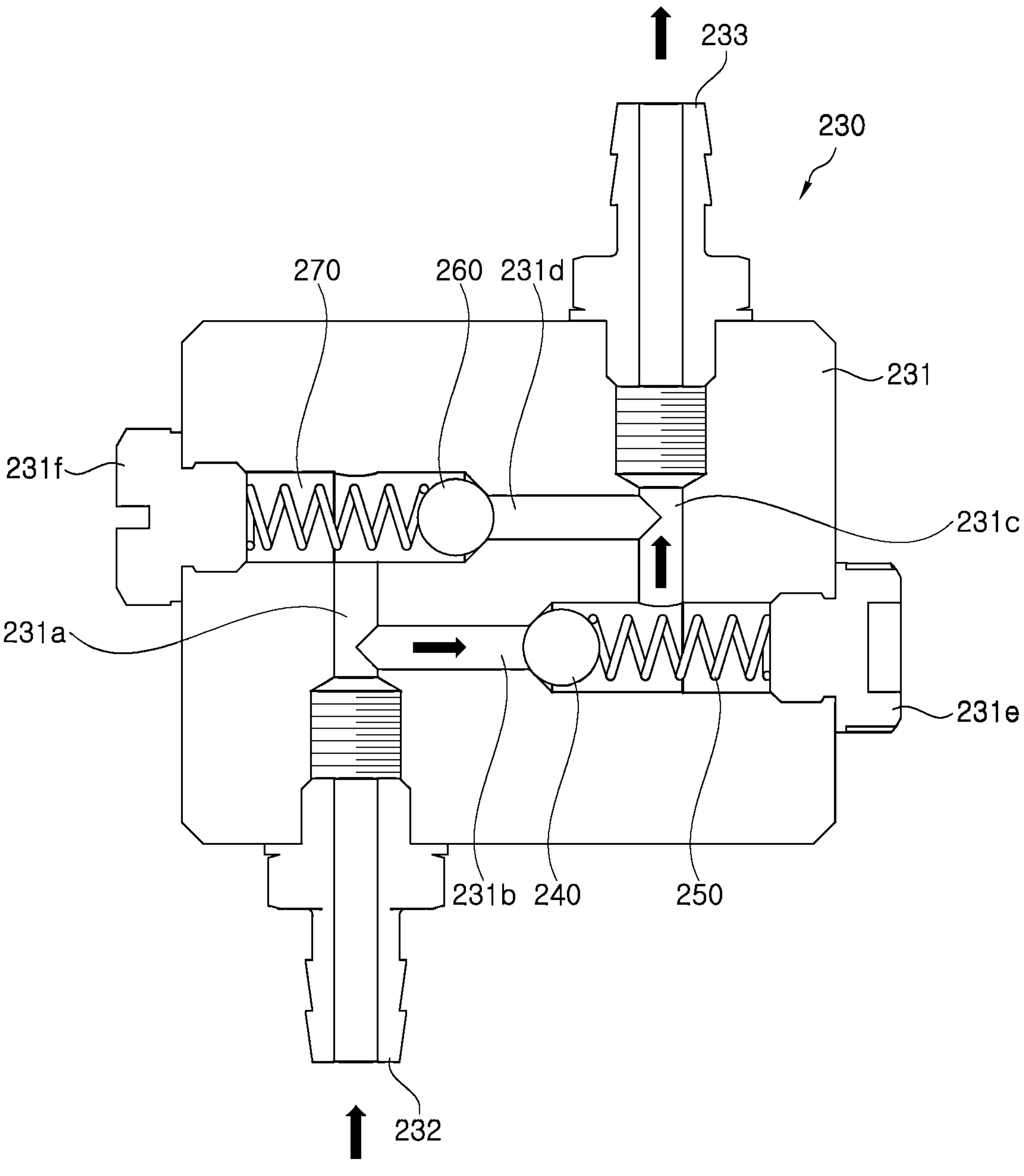
FIG. 8 is a view showing a retention prevention device according to the present invention.
Figure 9:
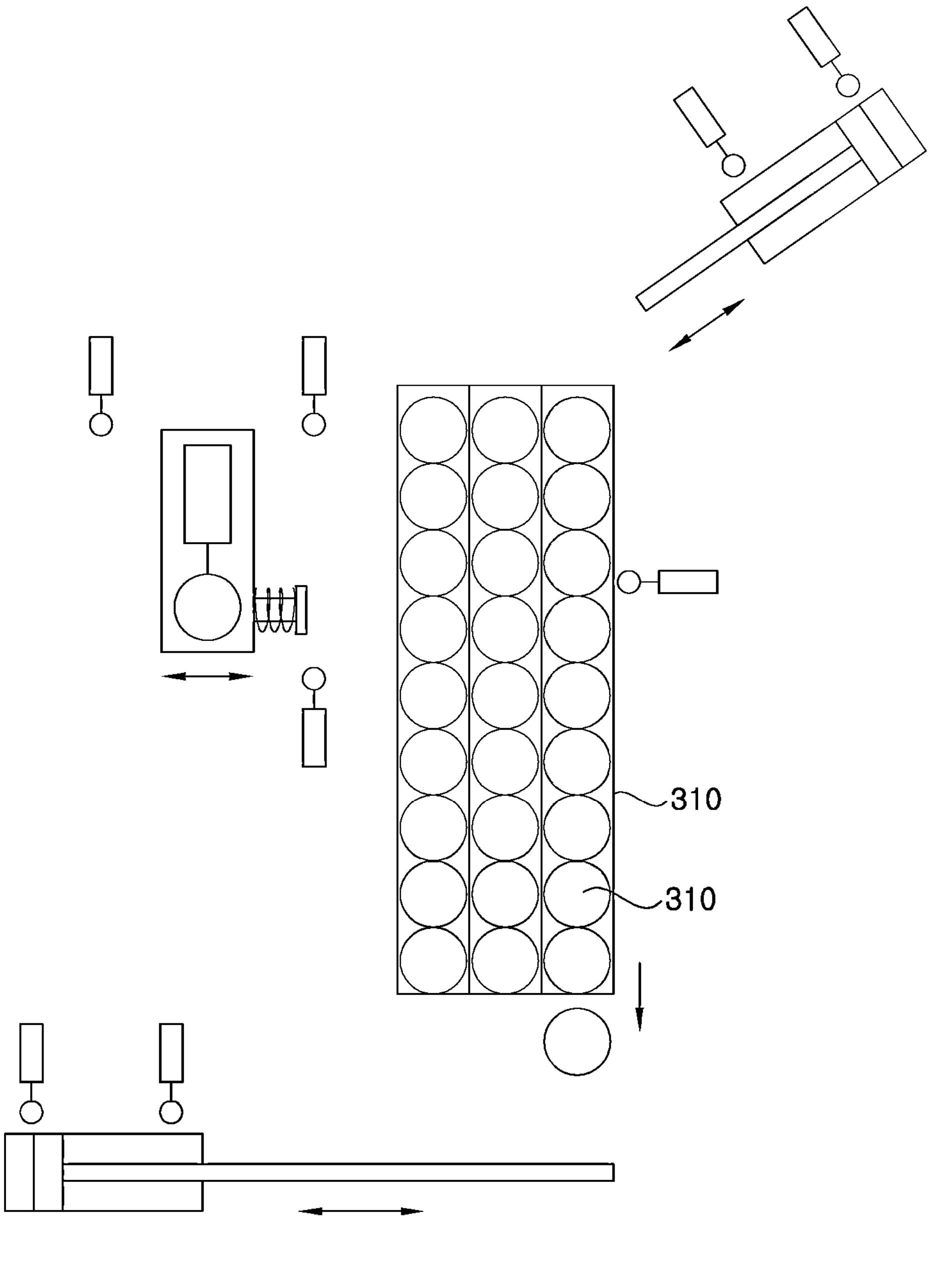
FIG. 9 is a view for explaining the container supply part according to the present invention.

The retention prevention device 230 is used for preventing the raw material from remaining in the raw material supply pipe and the injection nozzle 610 after the supply of the raw material is completed. As shown in FIG. 8, the retention prevention device 230 includes a body portion 231, a pouch connecting member 232 configured to connect the body portion 231 and the raw material pouch 220, and an injection nozzle connecting member 233 configured to connect the body portion 231 and the injection nozzle 610.

Inside the body portion 231, a first flow path 231*a* connected to the pouch connecting member 232, a second flow path 231*b* vertically branched from the first flow path 231*a*, a third flow path 231*c* vertically branched from the second flow path 231*b*, and a fourth flow path 231*d* configured to connect the first flow path 231*a* and the third flow path 231*c* to each other are formed.

A first ball 240, a first spring 250, and a first sealing member 231*e* are provided in the second flow path 231*b*.

A second ball 260, a second spring 270, and a second sealing member 231*f* are provided in the fourth flow path 231*d*.

In the retention prevention device 230, when the raw material is supplied to the injection nozzle 610 by a pump (not shown), the raw material is supplied to the injection nozzle 610 while pushing the first ball 240.

That is, the raw material is supplied to the injection nozzle 610 through the pouch connecting member 232, the second flow path 231*b*, the third flow path 231*c*, and the injection nozzle connecting member 233.

When the operation of the pump is stopped, the first ball 240 is returned to its original position due to the elasticity of the first spring 250, so that the raw material does not flow toward the injection nozzle 610.

Accordingly, it is possible to, when the container is moved to the next injection nozzle 610 after one type of raw material is injected into the container, prevent the raw material remaining in the previous raw material injection pipe and the injection nozzle 610 from being leaked to contaminate the surroundings.

Next, the raw material injection part according to the present invention will be described.

Figure 5:
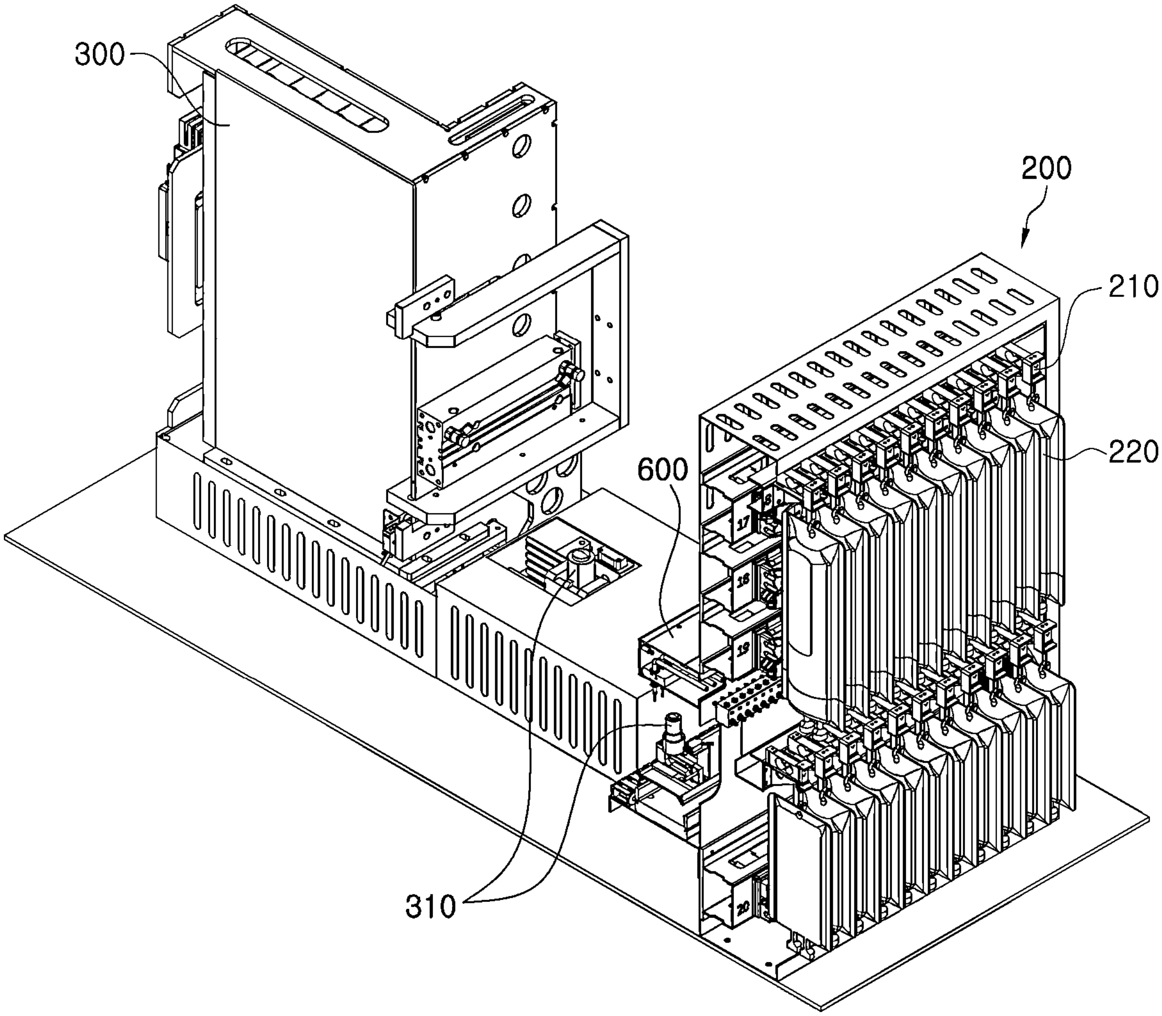
FIG. 5 is a perspective view showing a raw material supply part and a container supply part according to the present invention.
Figure 6:
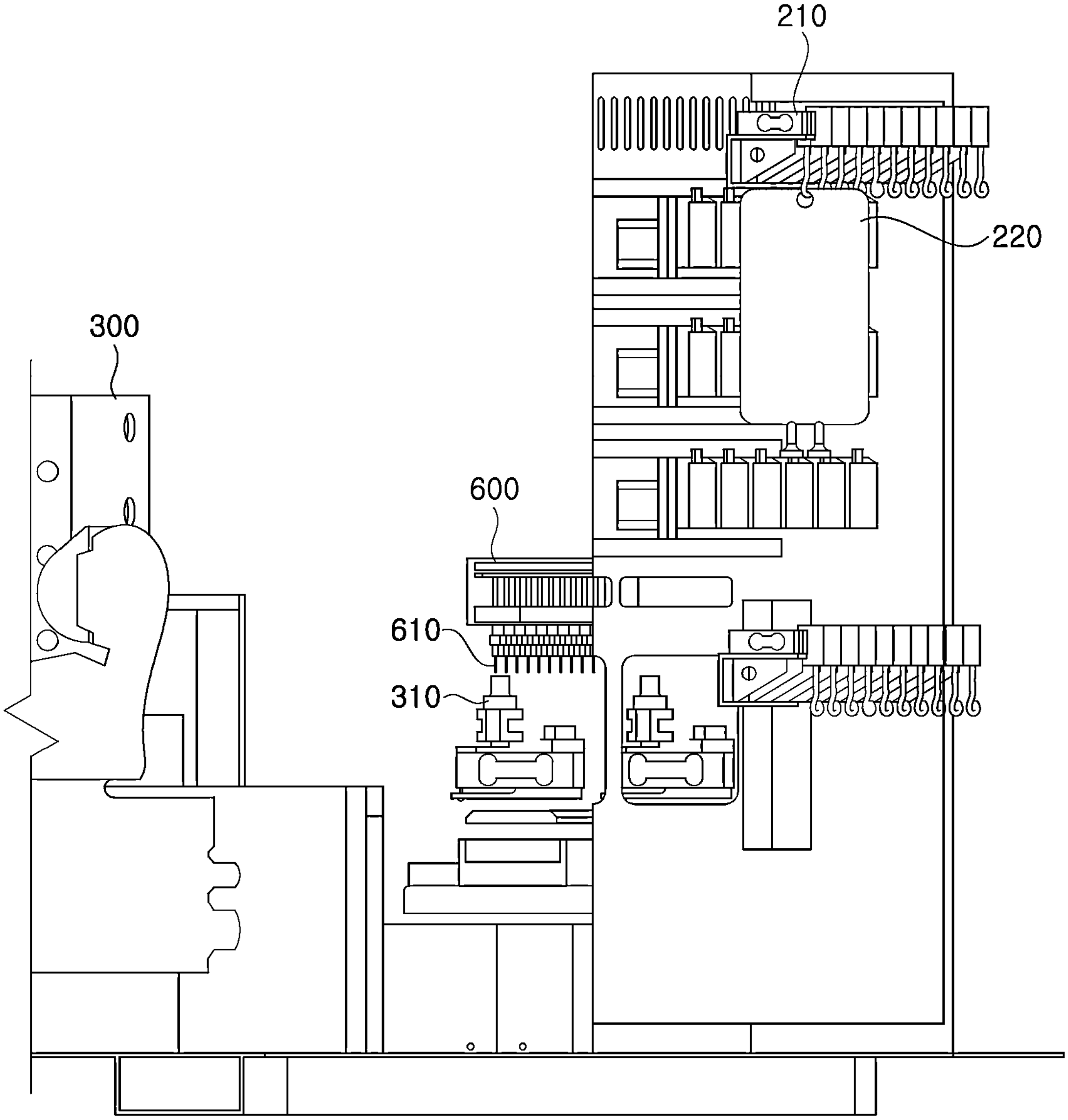
FIG. 6 is a front view showing the raw material supply part and the raw material injection part according to the present invention.
Figure 7:
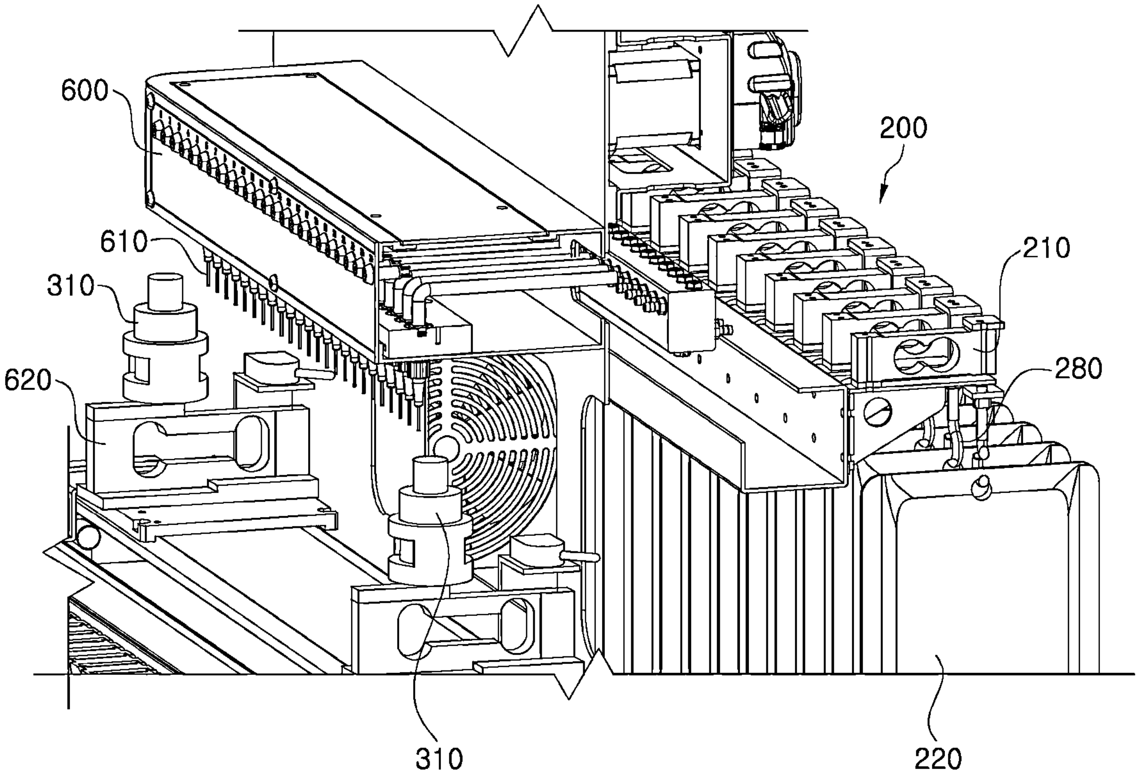
FIG. 7 is a perspective view showing the raw material injection part of the cosmetics manufacturing apparatus according to the present invention.

As shown in FIGS. 5 to 7, the raw material injection part 600 according to the present invention, which is used for injecting respective raw materials into the container 310, includes a plurality of injection nozzles 610 respectively connected to the raw material pouches 220 through the raw material supply pipes and configured to inject the raw materials into the container 310, a container transfer member 630 provided under the injection nozzles 610 and configured to transfer an empty container 310, a liquid amount sensing load cell 620 provided above the container transfer member 630 and configured to detect the amounts of the raw materials injected into the container 310, and a container detection sensor configured to detect the container 310 seated on the container transfer member 630.

The injection nozzles 610 are connected to the respective raw material pouches 220 through the raw material supply pipes and are provided as many as the number of raw material pouches 220.

The control part 192 causes an empty container 310 to move to below a selected injection nozzle 610, so that selected raw materials are sequentially injected into the empty container 310.

That is, when a plurality of raw materials is selected, the empty container 310 is moved to below the corresponding injection nozzles 610 one after another to inject the selected raw materials into the container 310.

At this time, the liquid amount sensing load cells 62 make sure that correct amounts of raw materials are injected into the container 310.

Next, the container supply part according to the present invention will be described with reference to FIGS. 9 to 12.

The container supply part 300 according to the present invention is configured to supply a container for containing cosmetics. The container supply part 300 includes a cartridge loading part 330 configured to accommodate a plurality of cartridges 320 loaded with a plurality of containers 310, a cartridge transfer device 340 configured to transfer the cartridges 320 loaded with the containers 310 in a horizontal direction, a cartridge discharging device 360 configured to push the empty cartridge 320 to one side from the cartridge loading part 330, and a container erection member 350 configured to erect the container 310 laid down at the lower end of the cartridge 320.

Figure 10:
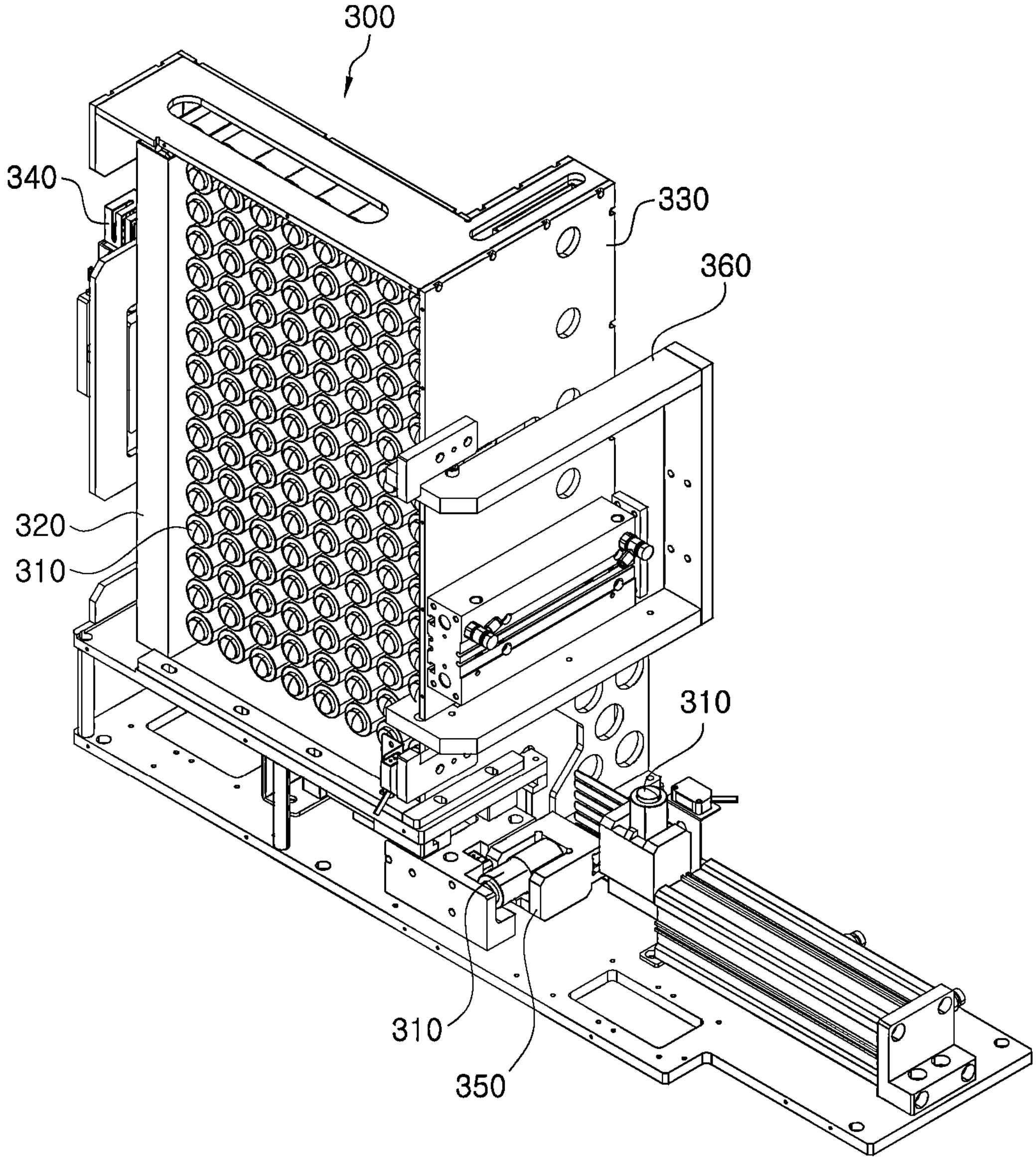
FIG. 10 is a perspective view of the container supply part according to the present invention.
Figure 11:
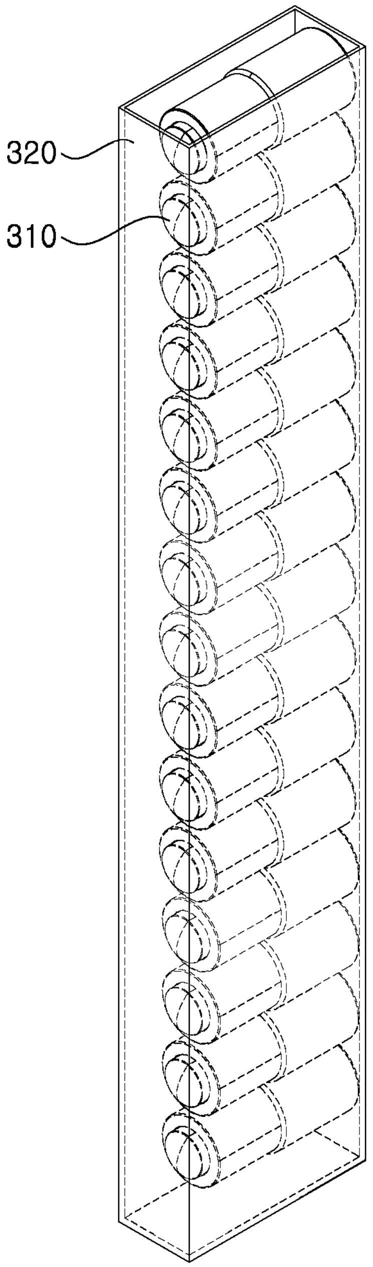
FIG. 11 is a perspective view showing a state in which the containers are accommodated in a cartridge according to the present invention.

That is, in the present invention, as shown in FIGS. 10 and 11, the containers 310 are laid down and loaded on the cartridges 320, and then the cartridges 320 are manually inserted into the cartridge loading part 330.

In this way, it is possible to load the plurality of containers 310 onto the cartridge loading part 330 at a time.

The present manufacturing apparatus further includes a plurality of sensors configured to check the horizontal movement of the cartridge 320 and the lowered state of the container 310.

Accordingly, when all the containers 310 are discharged from each cartridge 320, the empty cartridge 320 is automatically pushed aside, and the remaining cartridges 320 are automatically moved sideways by one click.

In the present invention, the container 310 is supplied in a state in which the cap 312 is fastened to the container body 311 without separating the cap 312. Therefore, it is possible to prevent impurities from being mixed into the container 310.

In addition, as shown in FIGS. 1 and 2, the present manufacturing apparatus includes an articulated robot 400 installed at the center of the table 190 and configured to pick up the container 310 with a gripper 410 and transfer the container 310 to a predetermined position.

Since the articulated robot 400 itself is known in the art, a detailed description thereof will be omitted.

Figure 12:
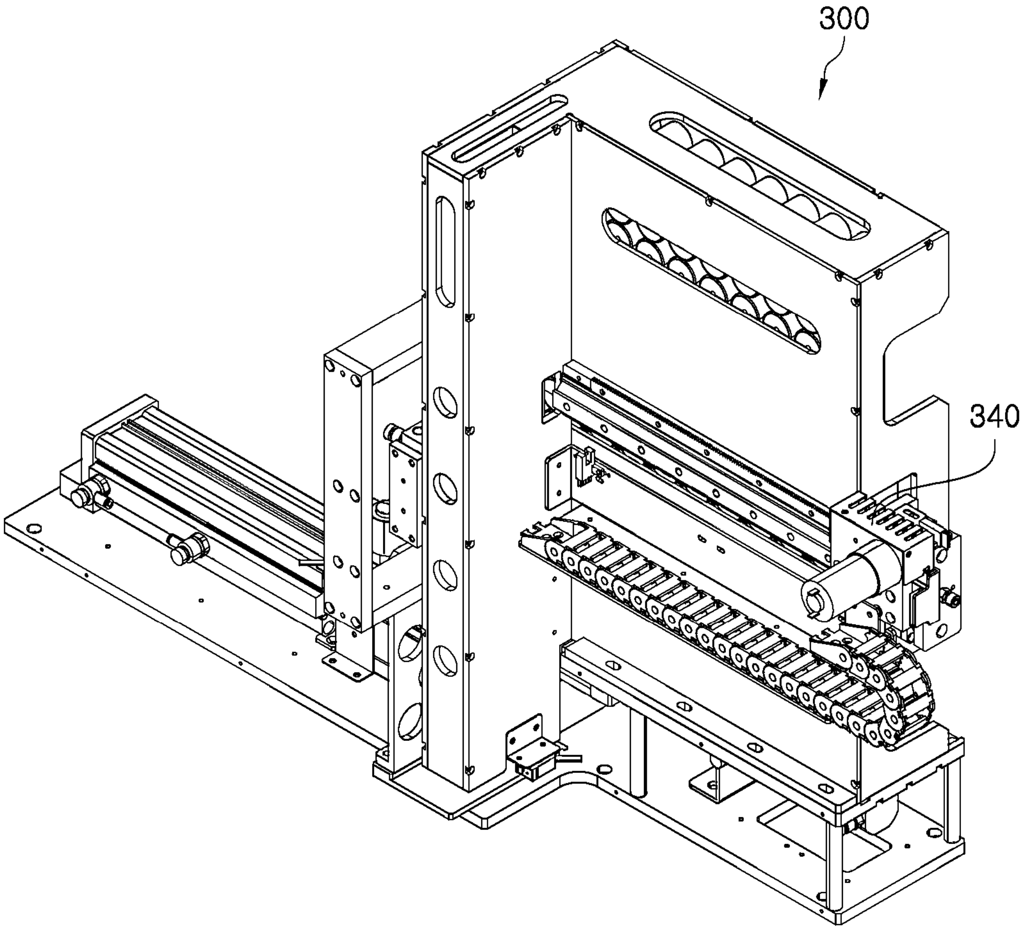
FIG. 12 is a perspective view showing the rear surface of the container supply part according to the present invention.

Hereinafter, a process of supplying the container from the container supply part will be described with reference to FIGS. 10 to 12.

In FIG. 10, each of the containers 310 loaded onto the rightmost cartridge 320 is allowed to fall down and is seated onto the container erection member 350. The container erection member 350 is moved by a predetermined distance in the horizontal direction and then rotated by 90 degrees to erect the container 310 upright.

Then, the gripper 410 of the articulated robot 400 picks up the container 310 and places it onto a cap separation/fastening device.

When the gripper 410 of the articulated robot 400 picks up the container 310, the container election member 350 returns to its original position and repeats the same operation to bring the next container 310 into a standby state.

When all the containers inside the cartridge 320 located at the rightmost position in FIG. 10 are discharged, the cartridge discharging device 360 provided on the right side of the cartridge loading part 330 pushes the empty cartridge 320 sideways from the cartridge loading part 330.

Then, the cartridge transfer device 340 provided on the left side of the cartridge loading part 330 moves the cartridge 320 to the right by one click.

When all the empty cartridges 320 are discharged to the outside of the cartridge loading part 330, new containers 310 are manually inserted into the cartridges 320, and then the cartridges 320 are inserted into the cartridge loading part 330.

Next, a device for separating and fastening the cap from and to the container will be described with reference to FIGS. 1, 23 and 24.

As shown in FIG. 1, the cap separation/fastening device according to the present invention includes a cap separation/fastening part 510 configured to separate and fasten the cap 312 after the container 310 picked up by the gripper 410 of the articulated robot 400 is seated on the cap separation/fastening part 510, and a cap storage part 520 configured to temporarily store the cap 312 separated from the container body 311.

Figure 23:
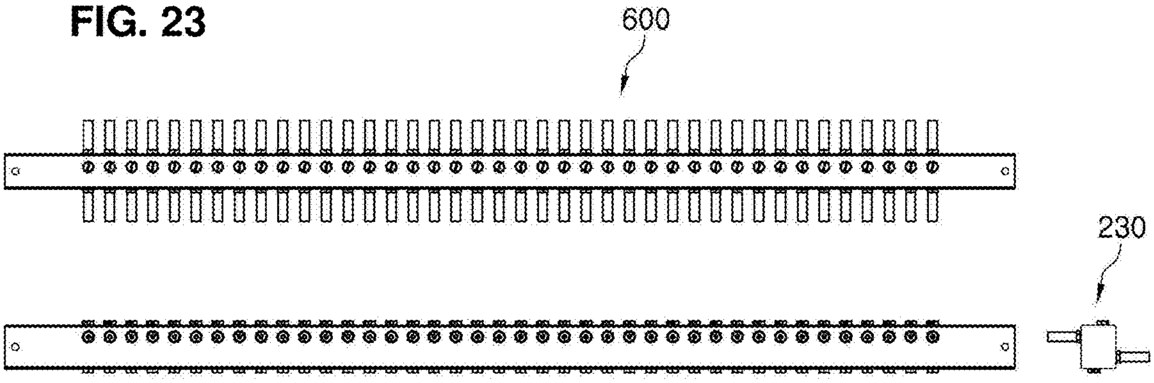
FIG. 23 is a view showing a raw material injection part and a retention prevention device according to the present invention.
Figure 24:
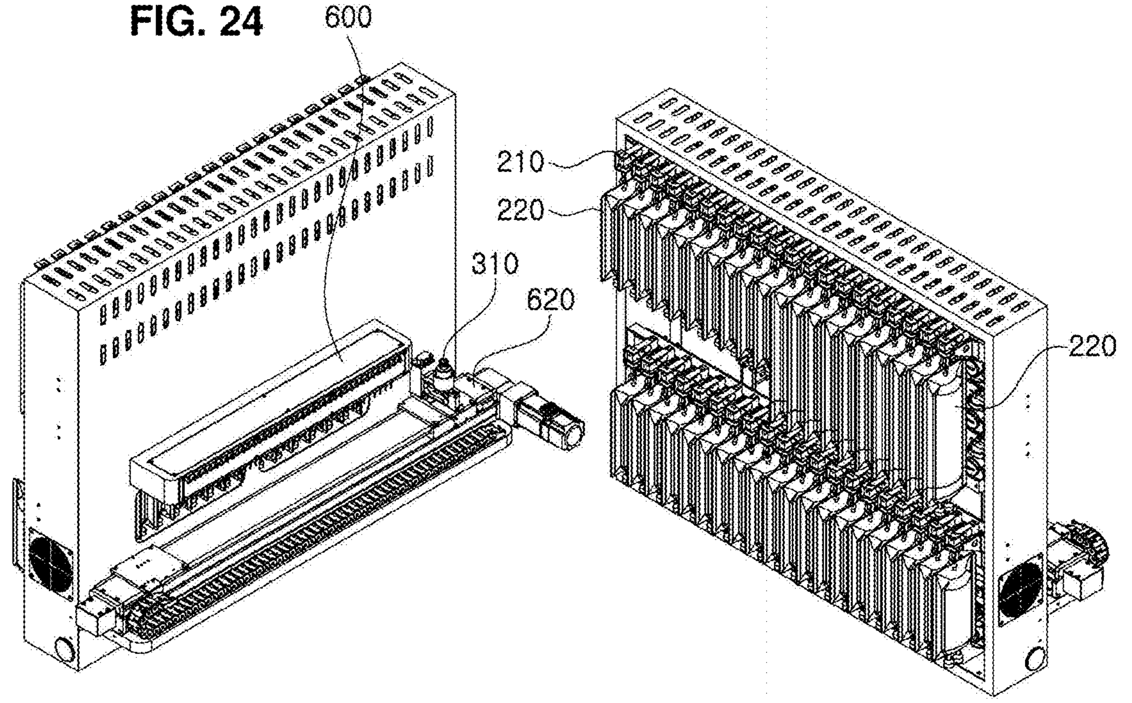
FIG. 24 is a perspective view of the raw material injection part according to the present invention.
Figure 25:
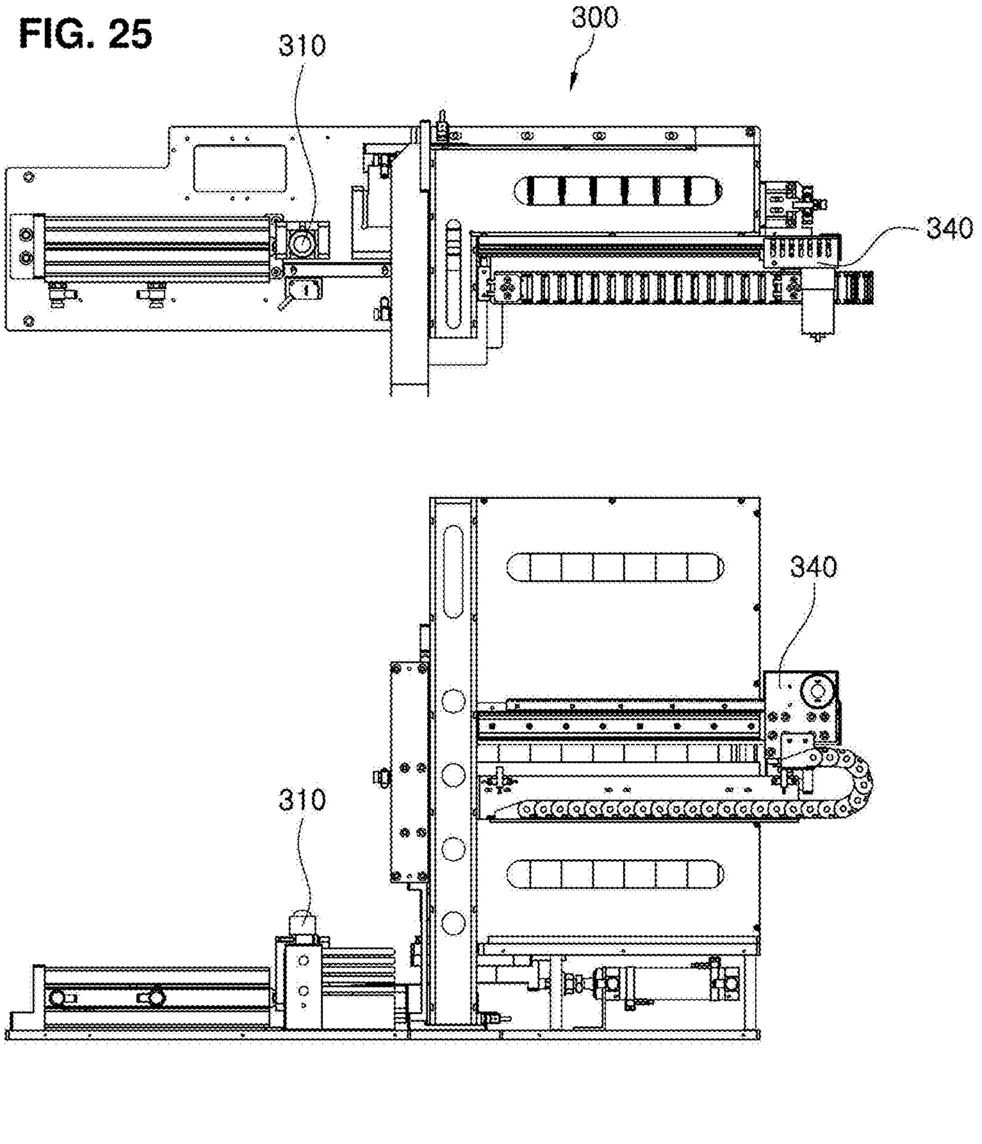
FIG. 25 is a view showing a container supply part according to the present invention.
Figure 26:
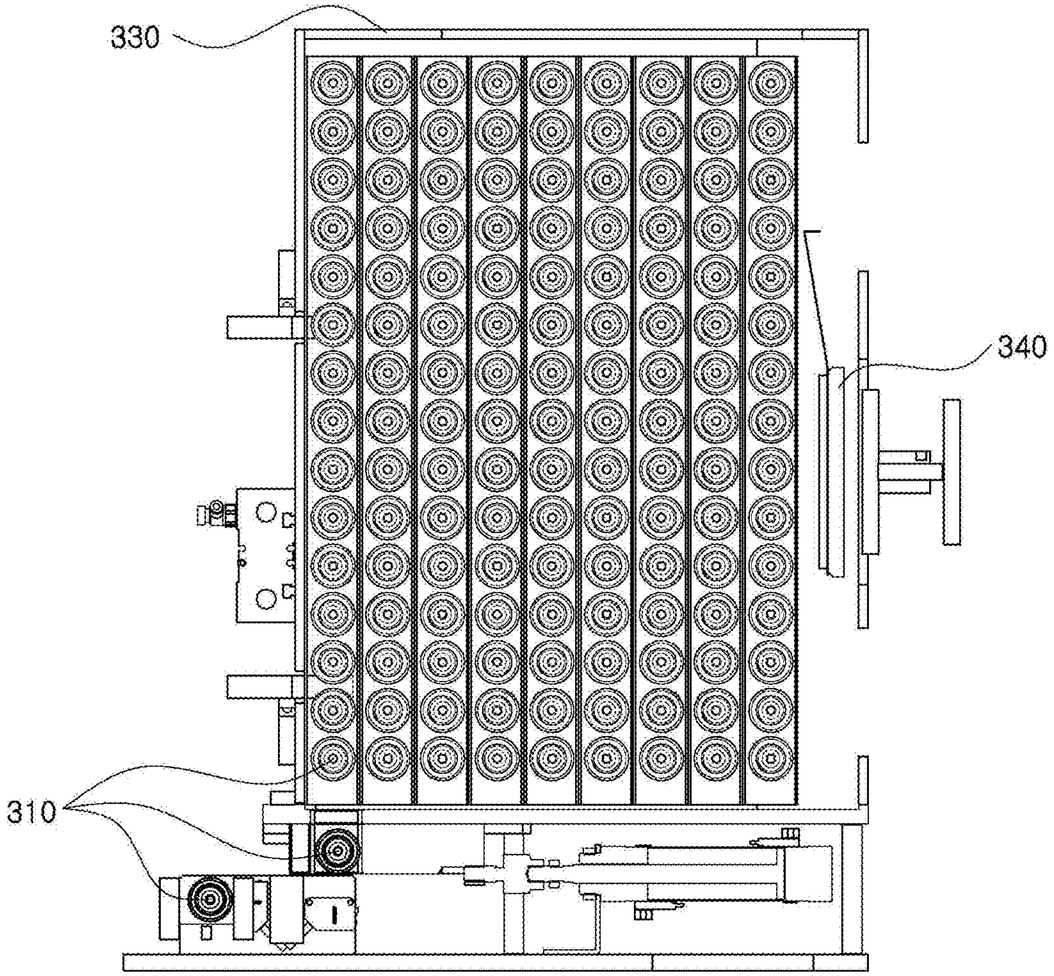
FIG. 26 is a view showing the container supply part according to the present invention.

As shown in FIGS. 23 and 24, the cap separation/fastening device 510 includes a rotary spindle 550 configured to rotate the container body 311 forward and reverse, a speed reducer 540 provided under the rotary spindle 550, and a driving motor 530 provided under the speed reducer 540.

Accordingly, by fixing the lower portion of the container to the upper portion of the rotary spindle 550 and then rotating the rotary spindle 550 forward and reverse, it is possible to separate the cap 312 from the container body 311 and fasten the cap 312 to the container body 311.

In addition, the cap separation/fastening part 510 is provided with a plurality of sensors for detecting whether the container body 311 is rotated to separate the cap 312 and whether the separated cap 312 is seated in the cap storage part 520.

With the above-described structure, it is possible to continuously perform the operation of separating and fastening the cap 312 from and to the container body 311.

Now, a process of separating and fastening the cap from and to the container body by the articulated robot will be described with reference to FIG. 13.

Figure 13A:
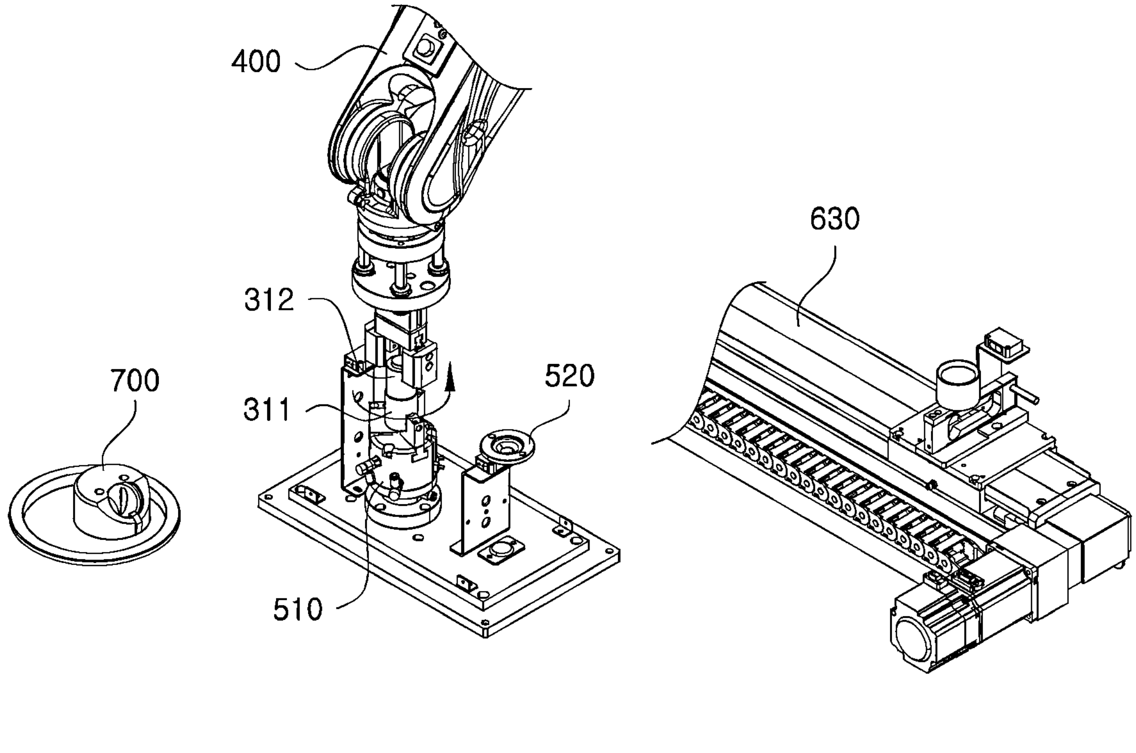
FIGS. 13A to 13F are views showing a process of separating and combining a container body and a cap in the cosmetics manufacturing apparatus according to the present invention.

First, as shown in FIG. 13A, the gripper 410 of the articulated robot 400 picks up the container from the container supply part 300 and then seats it on the cap separation/fastening part 510.

Then, when the speed reduction motor is driven to rotate the container body 311 counterclockwise, the cap 312 is separated from the container body 311.

Figure 13B:
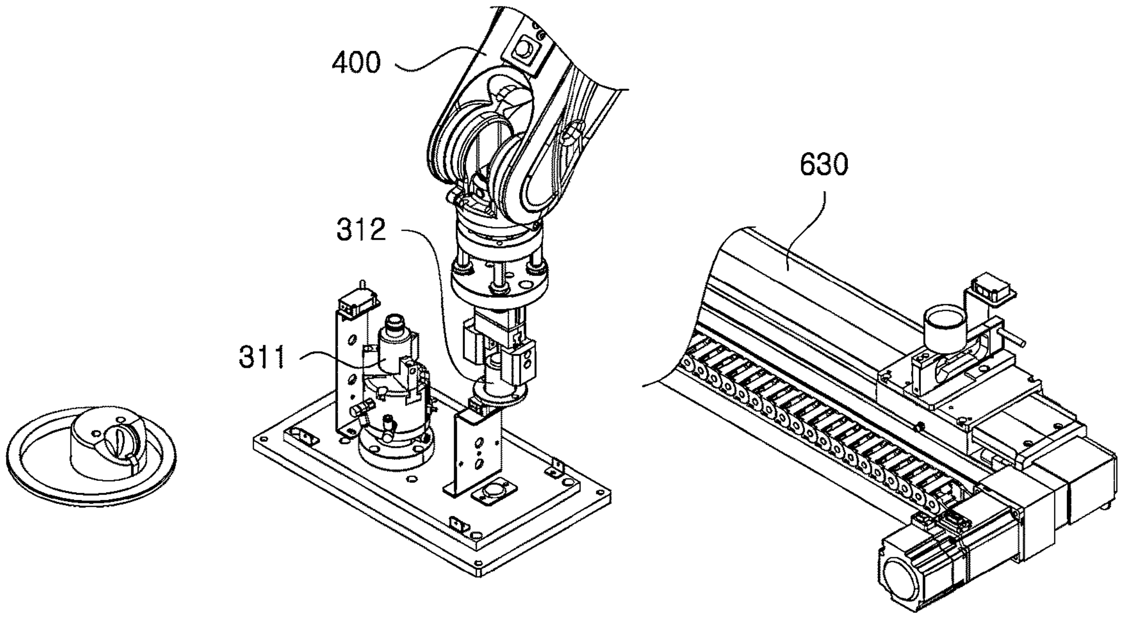

Then, as shown in FIG. 13B, the gripper 410 of the articulated robot seats the separated cap 312 in the cap storage part 520.

Figure 13C:
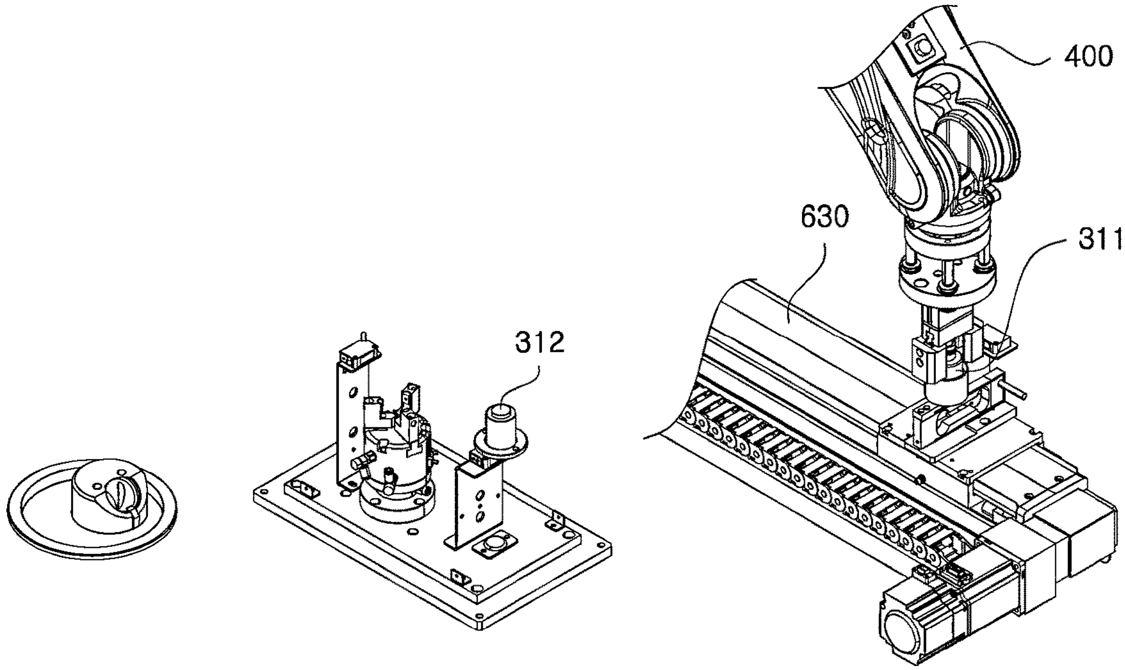

Then, as shown in FIG. 13C, the container body 311 is positioned on the container transfer member 630 of the raw material injection part 600.

Figure 13D:
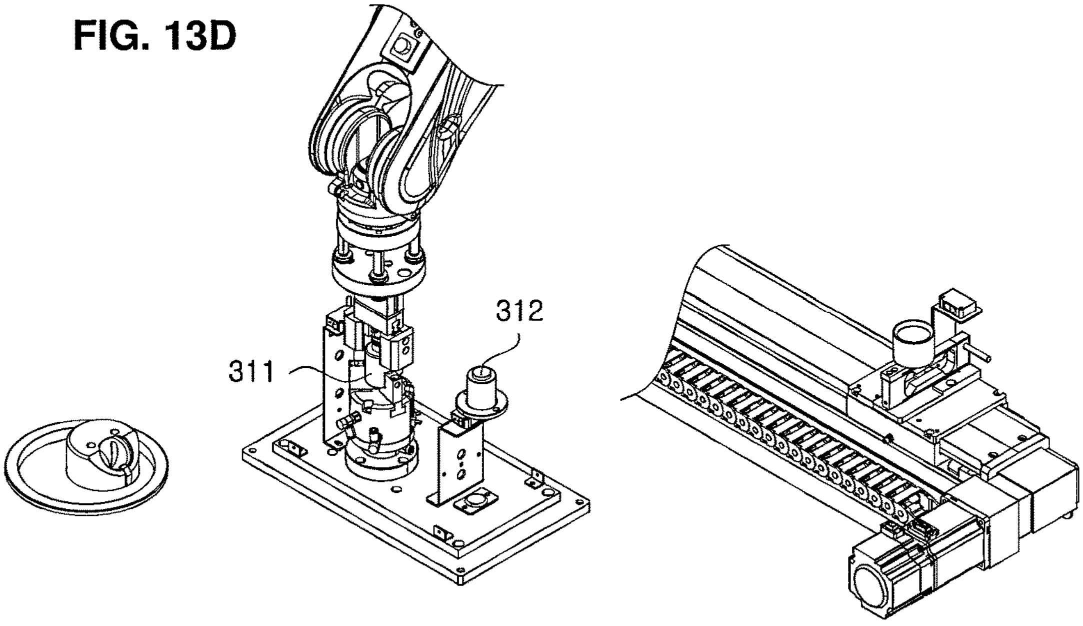

When the injection of the raw materials into the container body 311 is completed, as shown in FIG. 13D, the gripper 410 of the articulated robot seats the container body 311 filled with the raw materials on the cap separation/fastening part 510 again.

Figure 13E:
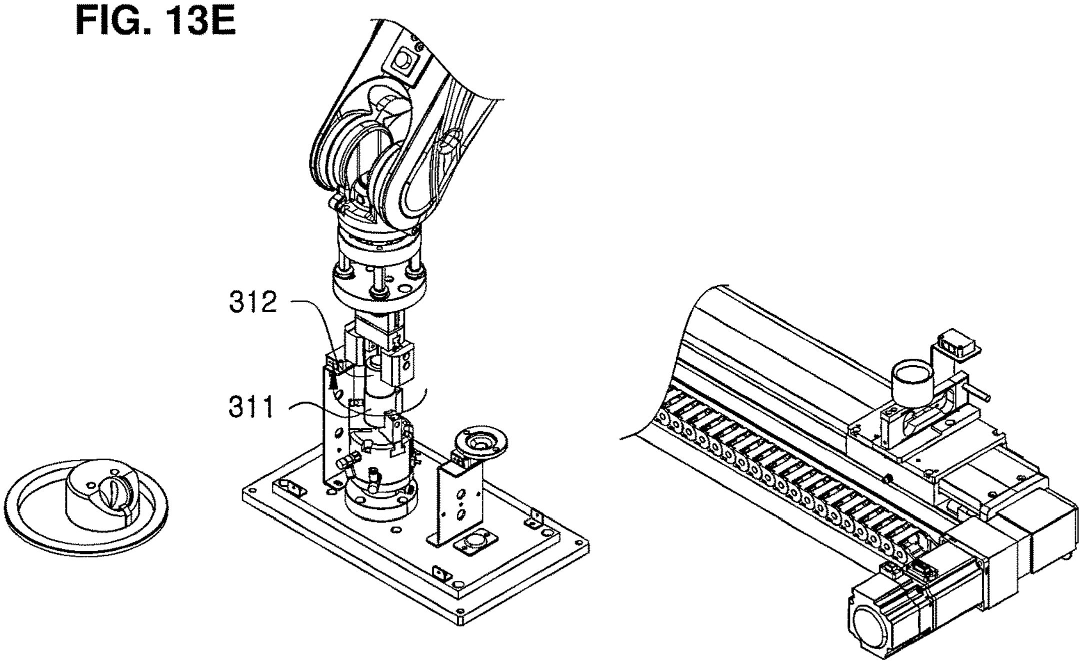

Then, as shown in FIG. 13E, the gripper 410 of the articulated robot picks up the cap 312 in the cap storage part 520 and places it on the container body 311 seated on the cap separation/fastening part 510.

Then, when the reduction motor is driven to rotate the container body 311 clockwise, the cap 312 is fastened to the container body 311.

Figure 13F:
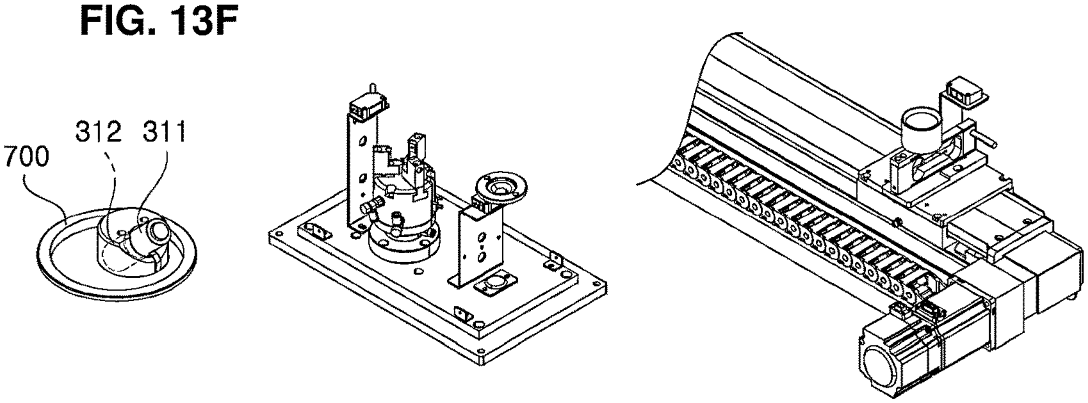

Then, as shown in FIG. 13F, when the gripper 410 of the articulated robot picks up the container 310 and seats it on the container fixing member 710 of the stirrer 700, the stirrer 700 is operated to stir the raw materials contained in the container 310.

Now, the stirrer 700 of the present invention will be described with reference to FIGS. 14 to 18.

Figure 14:
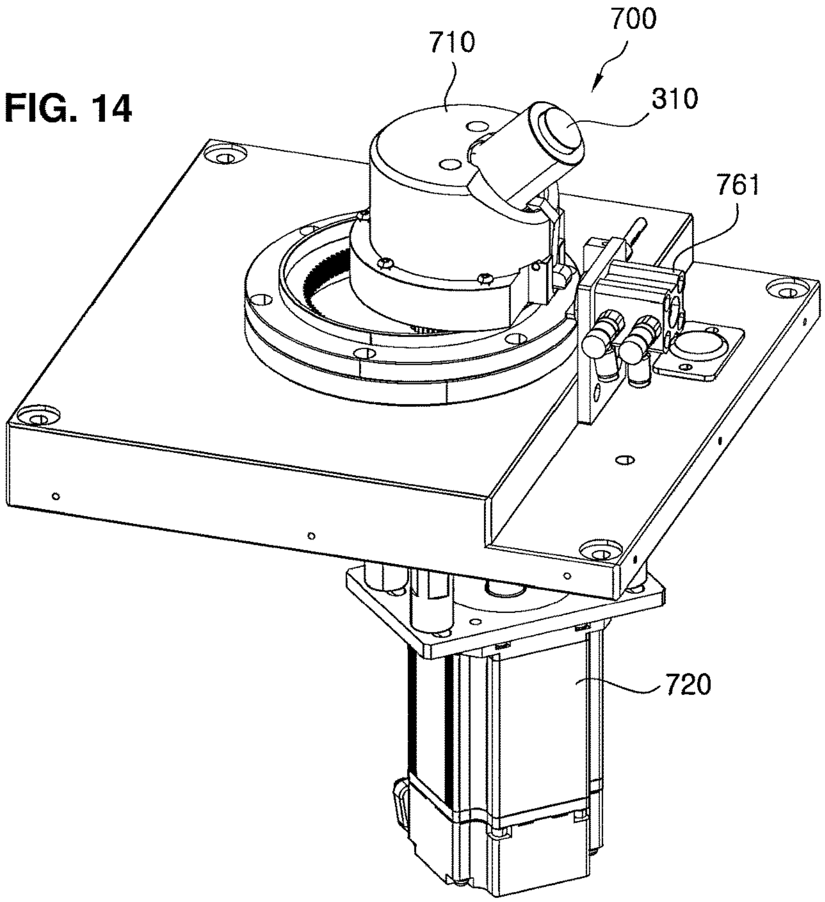
FIG. 14 is a perspective view showing a stirrer according to the present invention.
Figure 15:
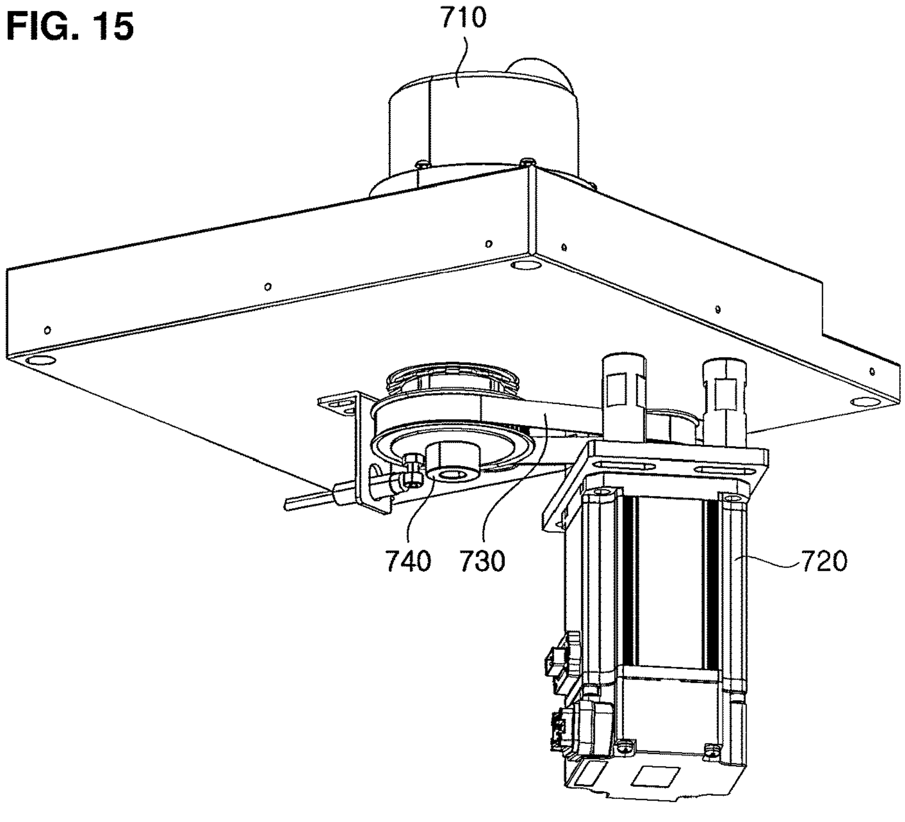
FIG. 15 is a perspective view showing the lower portion of the stirrer according to the present invention.
Figure 16:
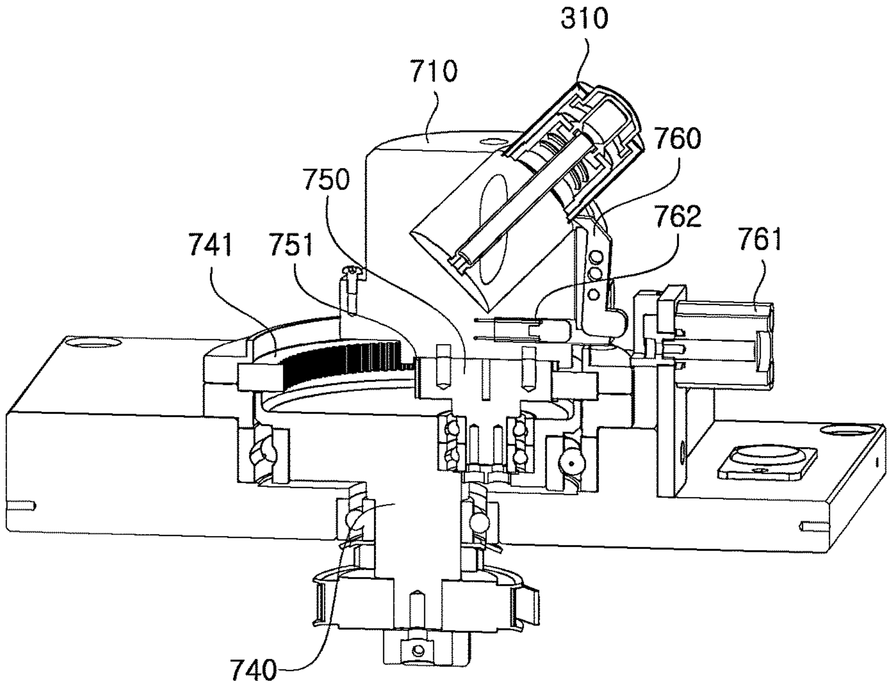
FIG. 16 is a cutaway perspective view of the stirrer according to the present invention.

As shown in FIGS. 14 to 16, the stirrer 700 according to the present invention includes a main shaft 740, a ring-shaped outer gear 741 formed with teeth on the inner circumferential surface thereof and assembled with the main shaft 740 at the lower portion thereof, a motor 720 connected to the main shaft 740 via a belt 730 and configured to rotate the outer gear 741, an inner gear 751 assembled on the inner circumferential surface of the outer gear 741 to make a planetary motion, and a container fixing member 710 provided above the inner gear 751 so that the container 310 can be obliquely seated thereon.

In addition, the lower portion of the container fixing member 710 is assembled with an auxiliary shaft 750 having the inner gear 751 formed at the upper portion thereof.

Figure 17:
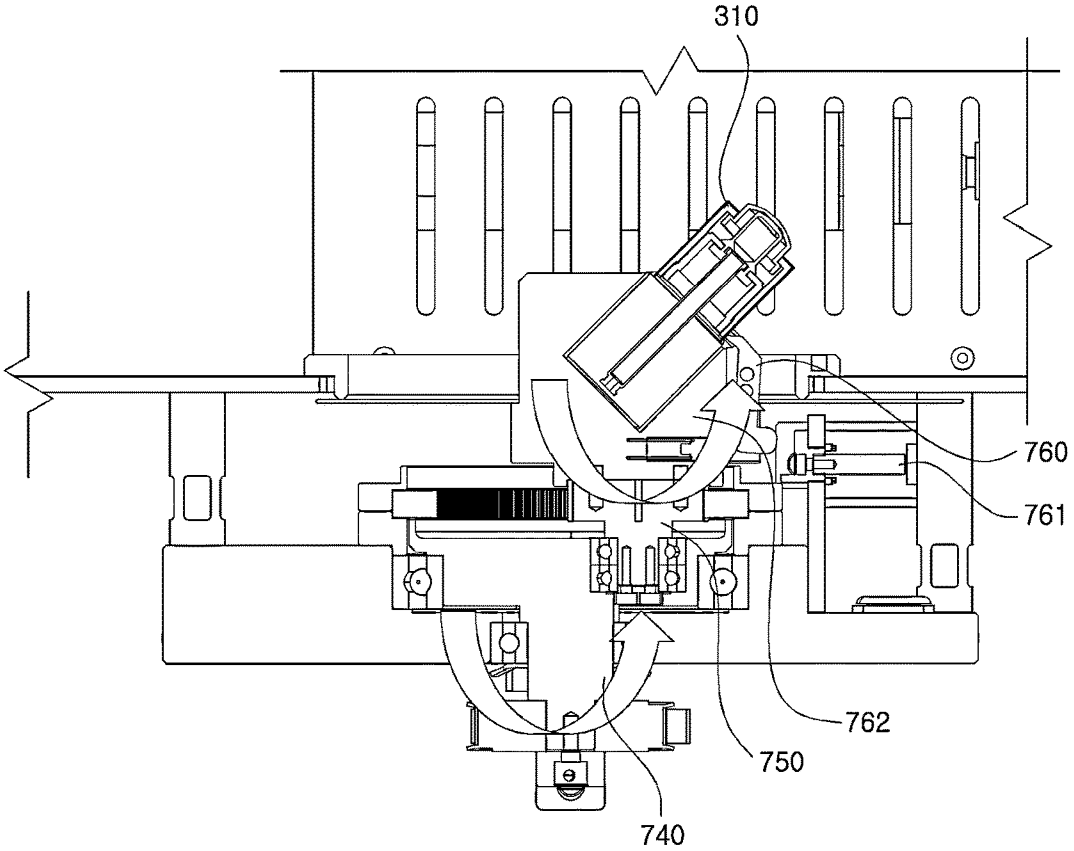
FIG. 17 is a view showing the rotational motion and revolving motion of the stirrer according to the present invention.
Figure 18:
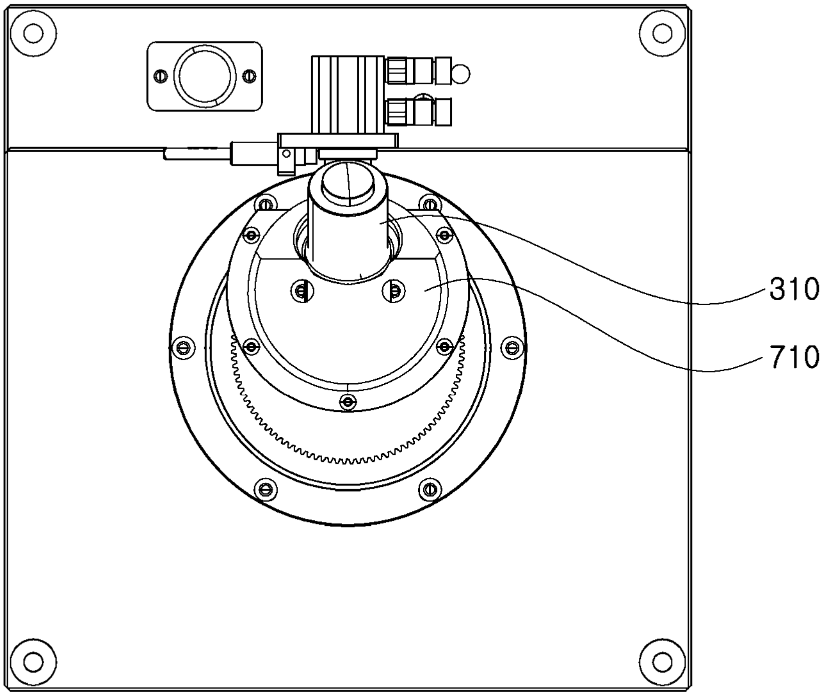
FIG. 18 is a perspective view showing the upper portion of the stirrer according to the present invention.
Figure 18:
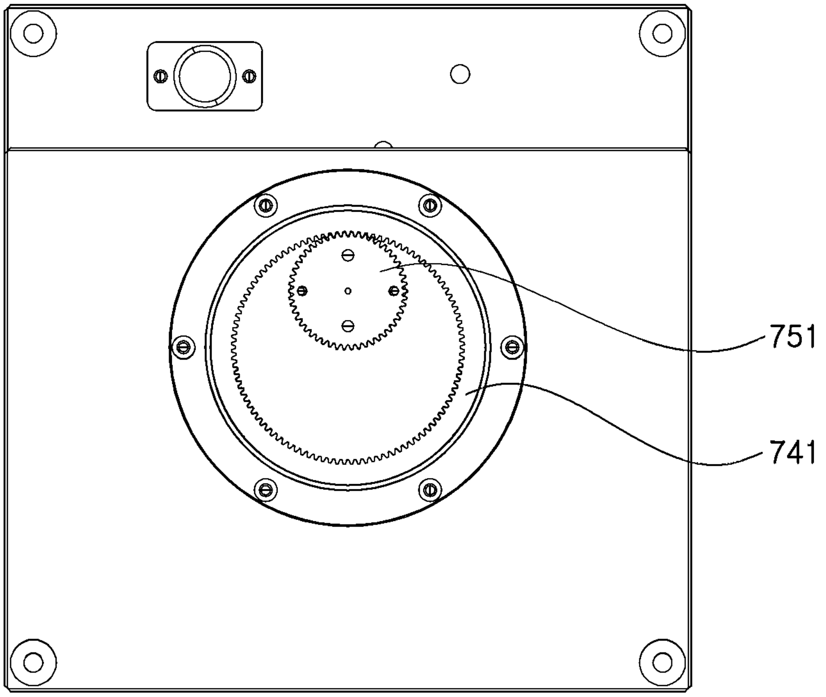
Figure 19:
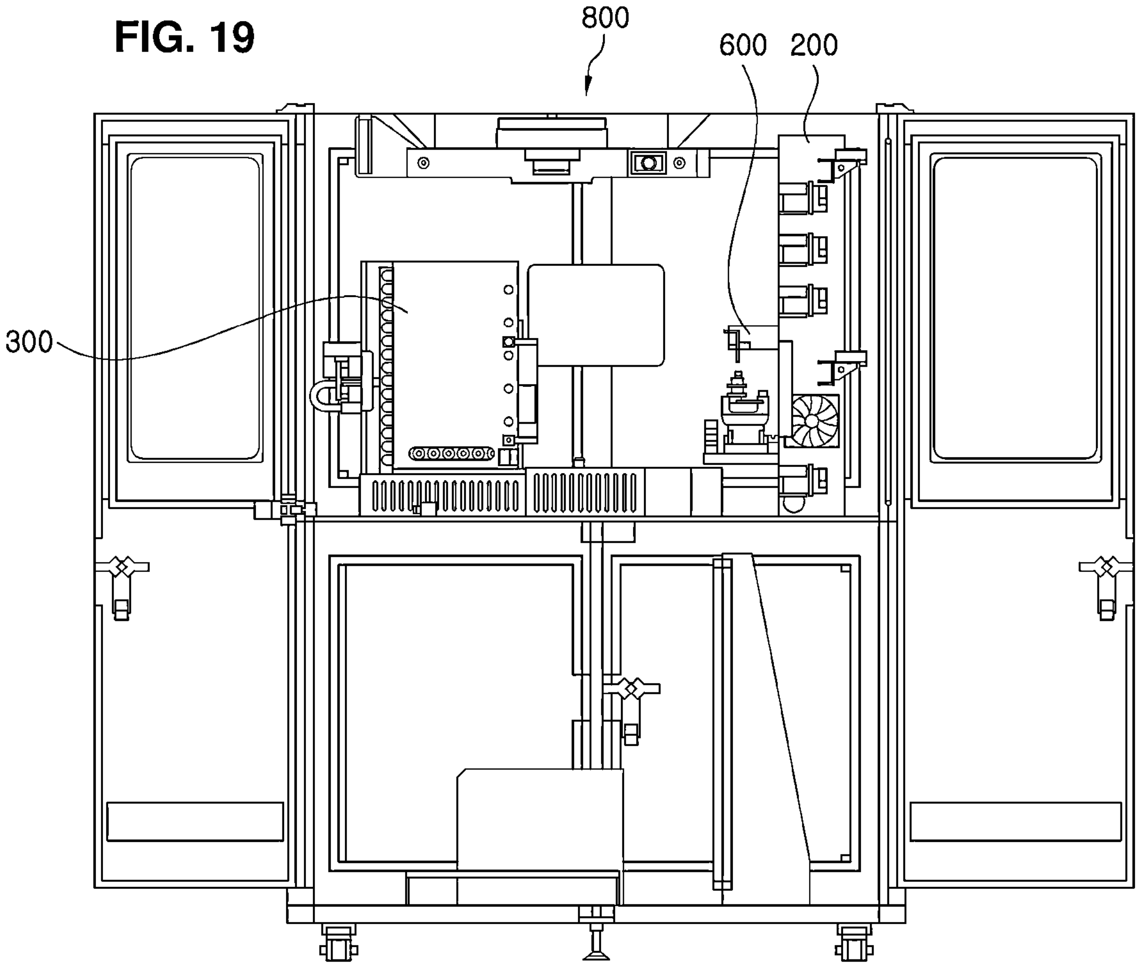
FIG. 19 is a front view showing a state in which the door is opened in the cosmetics manufacturing apparatus according to the present invention.
Figure 20:
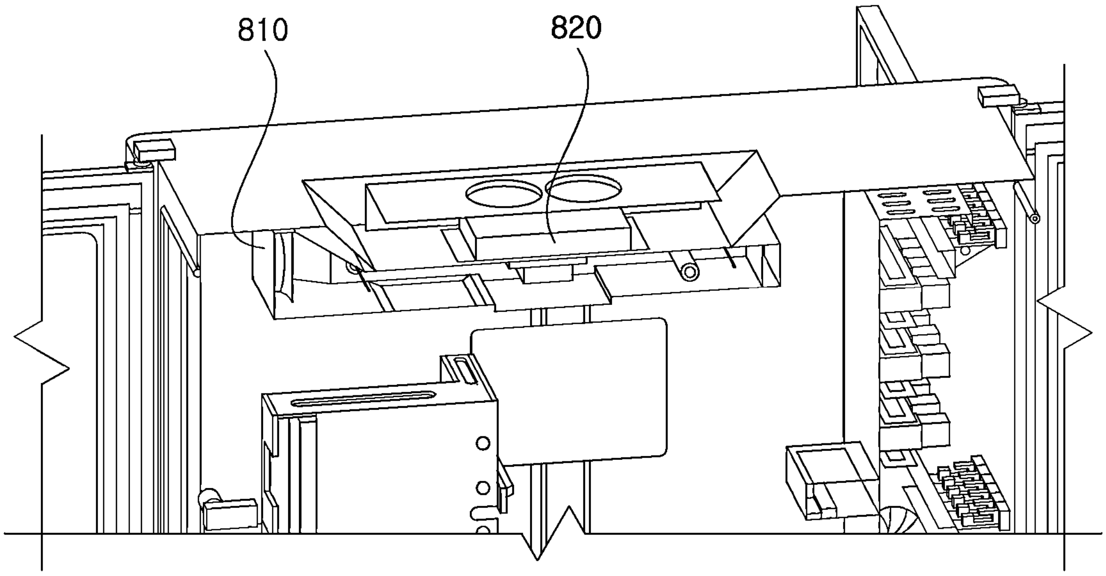
FIG. 20 is a view showing an air conditioning sterilizing part according to the present invention.
Figure 21:
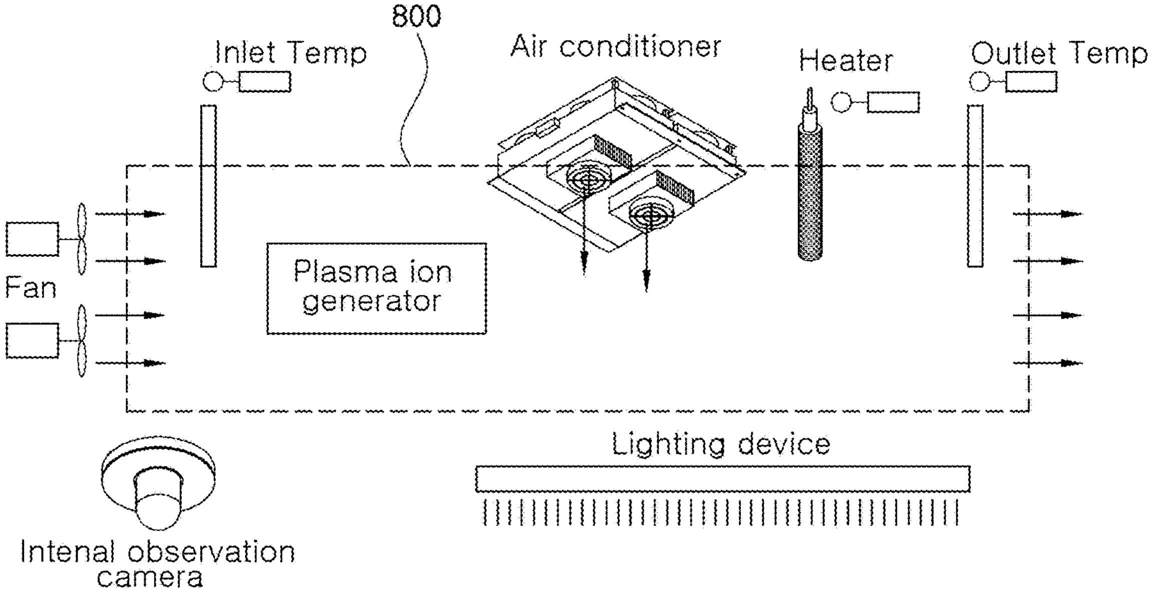
FIG. 21 is a view for explaining the configuration of the air conditioning sterilizing part according to the present invention.
Figure 22:
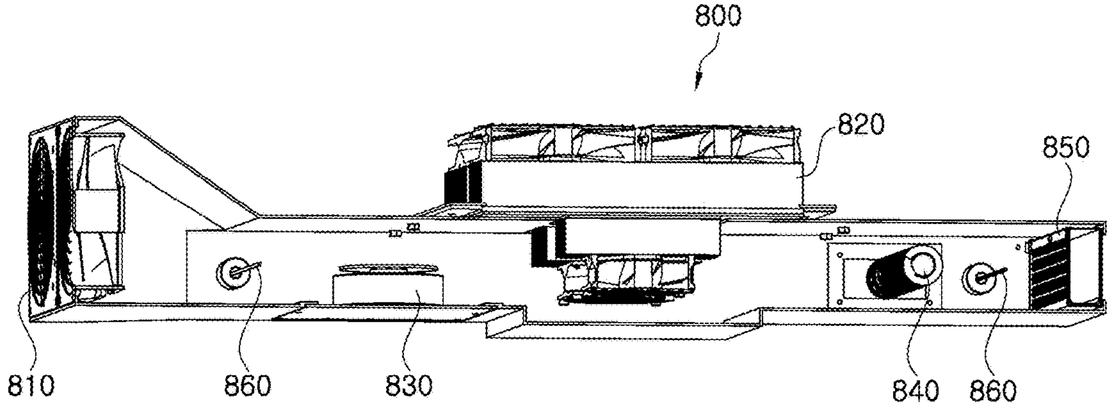
FIG. 22 is a perspective view showing the air conditioning sterilizing part according to the present invention.

As shown in FIGS. 17 and 18, the central axis of the main shaft 740 and the central axis of the auxiliary shaft 750 are out of alignment from each other. The outer gear 741 connected to the main shaft 740 and the inner gear 751 connected to the auxiliary shaft 750 are meshed with each other.

When the outer gear 741 is rotated by the above-described structure, the inner gear 751 meshed with the teeth on the inner circumferential surface of the outer gear makes rotation about its own axis and makes revolution about the main shaft 740.

Various raw materials having different viscosities can be thoroughly stirred by the above-described rotation and revolution, and the stirring time can be shortened to within a few seconds.

In addition, since the container 310 itself is inclined, the mixing of the raw materials can be further improved by the action of a centrifugal force.

On one side of the outer circumferential surface of the container fixing member 710, a clamping lever 760 for firmly fixing the container 310, a clamp cylinder 761 for attaching and detaching the container by operating the clamping lever 760, and a clamp spring 762 for applying an elastic force to the clamping lever 760 are provided.

In addition, a sensor for detecting the forward and backward motion of the clamp cylinder 761 is provided to make sure that stirring is started when the clamping operation for the container 310 is completed and clamping is automatically released when the rotation of the stirrer is stopped.

The container subjected to the stirring is picked up by the gripper 410 of the articulated robot and discharged to the outside of the housing 100 through the cosmetics outlet 191.

Now, the air conditioning sterilizing part according to the present invention will be described with reference to FIGS. 19 to 22.

The air conditioning sterilizing part 800 according to the present invention is installed on the upper portion of the housing 100, and includes a blower fan 810, an air conditioner 820, a plasma ion generator 830, a heater 840, an ozone filter 850, an internal observation camera, and a lighting device.

Since all of these components are well-known in the art, a detailed description thereof will be omitted.

By using the air conditioning sterilizing part 900, the temperature inside the housing 100 can be kept constant, and the air inside the housing can be kept clean.

Next, a process of manufacturing and selling cosmetics according to the present invention will be described.

After the consumer selects the desired cosmetic type, the ingredients and the like, and completes the payment by card or cash, the wireless skin measuring instrument 140 located in the front of the housing 100 is taken out and brought into contact with their skin.

Then, the skin measuring instrument 140 measures the skin condition of the consumer, and transmits the measurement information to the remote central control device 900.

In addition, the consumer may directly input information such as skin allergy or the like along with his/her gender and age by touching a menu on the touch screen 150.

The central control device 900 determines the ingredients and blending ratio of raw materials suitable for the skin condition of the consumer by using the data accumulated in the server S, and transmits this information to the control part 192 of the manufacturing apparatus.

Then, the control part 192 of the manufacturing apparatus operates the articulated robot 400 so that the gripper 410 picks up the container 310, separates the cap 312, and then seats the container body 311 on the container transfer member 630 of the raw material injection part 600.

Then, the container transfer member 630 on which the container 310 is seated is moved to below the respective injection nozzles 610 so that the selected raw materials are injected into the container 310.

When the injection of the raw materials is completed, the gripper 410 of the articulated robot picks up the container 310, puts the cap 312 on the container 310, and then places the container 310 on the stirrer 700.

In the stirrer 700, the raw materials are thoroughly stirred by the combination of rotation and revolution.

When the gripper 410 of the articulated robot discharges the container 310 to the outside of the housing 100 through the cosmetics outlet 191 after the stirring of the raw materials is completed, the manufacture and sale of cosmetics is completed.

The conventional individual-specific cosmetics manufacturing selling machine is of the type in which liquid cosmetic raw materials are supplied into raw material containers, and the raw material container having an insufficient raw material is filled with a new raw material. The cosmetic container is supplied into a housing in a state in which a container body and a cap are separated from each other.

As a result, in the process of filling the raw material into the raw material container, impurities may be mixed and air oxidation may occur.

In addition, when the cosmetic container is moved to the next injection nozzle after one type of cosmetic raw material is injected, the raw material solution remaining in the previous raw material supply pipe and injection nozzle is leaked to contaminate the surroundings.

In the present invention, each cosmetic raw material is separately supplied in the form of a replaceable pouch. Therefore, it is possible to reliably prevent impurities from being mixed into the container, and to prevent air oxidation that may otherwise occur during the replenishment of raw materials.

In addition, in the present invention, the retention prevention device is provided in the raw material injection part. Therefore, after the injection of one type of raw material is completed and the container is moved to the next injection nozzle, it is possible to prevent the raw material remaining in the previous raw material supply pipe and injection nozzle from being leaked to contaminate the surroundings.

In addition, since each raw material pouch is supplied in the form of hanging on each load cell, it is possible to automatically grasp the remaining amount of each raw material.

In addition, since each manufacturing apparatus is connected to the remote central control device through wireless communication, it is possible for the remote central control device to check the remaining amount of each raw material in real time.

In addition, since the central control device and the manager terminal of each manufacturing apparatus are connected through wireless communication, it is possible to notify the manager in real time whether there is a shortage of raw materials and whether an abnormality has occurred in each manufacturing apparatus.

This allows the manager of each manufacturing apparatus to quickly replenish raw materials and perform maintenance promptly.

In addition, the container is supplied in a state in which the container body and the cap are coupled to each other, and the cap is opened only when raw materials are injected. Therefore, it is possible to reliably prevent the mixing of impurities.

While the preferred embodiments of the present invention have been described above, the present invention is not limited to the above-described embodiments. Various modifications and changes may be made without departing from the scope and spirit of the present invention defined in the claims.

What is claimed is:

1. A raw material/container supply device for an individual-specific cosmetic manufacturing selling machine for supplying liquid cosmetic raw materials and a raw material storage container, the raw material/container supply device comprising:

a raw material supply device configured to supply cosmetic raw materials contained in disposable raw material pouches; and a container supply device configured to supply a container having a container body and a cap fastened to the container body, in a state in which the container is horizontally loaded on a cartridge, wherein each of the raw material pouches has a through-hole formed in an upper portion thereof so that each of the raw material pouches is hung on a hook of the raw material supply device passing through the through-hole, and wherein a remaining amount check load cell of the raw material supply device for detecting a remaining amount of raw material in one of the raw material pouches is provided on an upper portion of the hook.

2. The raw material/container supply device of claim 1, wherein the remaining amount check load cell is configured to detect a decrease in a weight of each of the raw material pouches and transmit the decrease in the weight to a control part provided in a lower portion of a housing.

3. The raw material/container supply device of claim 2, wherein the control part is configured to transmit a shortage of the raw material detected by the remaining amount check load cell to a remote central control device, and the central control device is configured to wirelessly transmit the shortage of the raw material through a wireless terminal of a manager of the cosmetic manufacturing selling machine.

4. The raw material/container supply device of claim 1, wherein the raw material supply device includes a plurality of pumps configured to feed the raw material in each of the raw material pouches to a raw material injection part through a raw material supply pipe, a plurality of driving motors configured to drive the plurality of pumps, and a retention prevention device configured to prevent the raw material from remaining in the raw material supply pipe and an injection nozzle after the raw material is injected into the container.

5. The raw material/container supply device of claim 4, wherein the retention prevention device includes a body portion, a pouch connecting member configured to connect the body portion to each of the raw material pouches, and an injection nozzle connecting member configured to connect the body portion to the injection nozzle.

6. The raw material/container supply device of claim 5, wherein the body portion has a first flow path connected to the pouch connecting member, a second flow path branched from the first flow path, a third flow path branched from the second flow path, and a fourth flow path configured to connect the first flow path and the third flow path to each other.

7. The raw material/container supply device of claim 6, wherein a first ball, a first spring and a first sealing member are provided in the second flow path, and a second ball, a second spring, and a second sealing member are provided in the fourth flow path.

8. The raw material/container supply device of claim 1, wherein the container supply device includes a cartridge loading part configured to accommodate a plurality of cartridges loaded with a plurality of containers, and a cartridge transfer device provided on one side of the cartridge loading part and configured to transfer the cartridges loaded with the plurality of containers in a horizontal direction.

9. The raw material/container supply device of claim 8, wherein a cartridge discharging device for detecting and pushing an empty cartridge to an outside of the cartridge loading part is further provided on another side of the cartridge loading part.

10. The raw material/container supply device of claim 8, further comprising:

a container erection member configured to rotate a container discharged from a bottom of one of the cartridges by 90 degrees after the container is moved by a predetermined distance.

11. The raw material/container supply device of claim 1, further comprising:

a cap separation/fastening device configured to separate the cap from the container moved by a gripper of an articulated robot and fasten the cap after the raw materials are injected into the container body.

12. The raw material/container supply device of claim 11, wherein the cap separation/fastening device includes a cap separation/fastening part configured to separate and fasten the cap from and to the container body by rotating the container body in a state in which the cap is gripped by the gripper of the articulated robot, and a cap storage part configured to temporarily store the cap separated from the container body.

13. The raw material/container supply device of claim 12, wherein the cap separation/fastening part includes a rotary spindle configured to rotate the container body forward and reverse, a speed reducer provided under the rotary spindle, and a driving motor provided under the speed reducer.

* * * * *